United States Patent

Holland

[15] 3,636,524

[45] Jan. 18, 1972

[54] MULTIPLEX COMMUNICATION SYSTEM

[72] Inventor: Grahm Holland, Silver Spring, Md.

[73] Assignee: Tel-Tech Corporation

[22] Filed: Dec. 8, 1969

[21] Appl. No.: 883,206

[52] U.S. Cl. ....................................340/172.5, 179/15 BA

[51] Int. Cl. ....................................................H04j 3/00

[58] Field of Search ...............................340/172.5; 179/15

[56] References Cited

UNITED STATES PATENTS

| | | |
|---|---|---|
| 3,042,751 | 7/1962 | Graham ..................................179/15 |
| 3,461,245 | 8/1969 | Johannes et al. ........................179/15 |
| 3,497,627 | 12/1970 | Blasbalg et al. .........................179/15 |

*Primary Examiner*—Raulfe B. Zache

*Attorney*—Finnegan, Henderson & Farabow

[57] ABSTRACT

In the multiplex transmission of data and control information, data information from a plurality of communication channels is continuously sampled at a first repetition rate. The sampled data information is transferred into serial arrangement at a second repetition rate, which exceeds the first repetition rate. The second repetition rate provides a series of time intervals for the transmission of data information. The serially arranged data information is transmitted in the form of transmission time frames during the time intervals of the series established by the second repetition rate. Since the second repetition rate exceeds the first repetition rate, there periodically appears an open time interval in the series of time intervals established by the second repetition rate which is not required for the transmission of data information. When the open time interval occurs, the transmission of data information is temporarily discontinued and a transmission time frame containing control information from the communication channels is transmitted during the open time interval. A set of identification signals is inserted into each transmission time frame, and the set of identification signals is varied in accordance with a predetermined signal pattern during the transmission of data information to identify transmission time frames containing data information. When control information is transmitted, the set of identification signals is altered from the predetermined signal pattern to identify a transmission time frame which contains control information.

30 Claims, 12 Drawing Figures

INVENTOR
GRAHAM HOLLAND

Finnegan, Henderson & Farabow
ATTORNEYS

INVENTOR
GRAHAM HOLLAND

*Finnegan, Henderson & Farabow*
ATTORNEYS

INVENTOR
GRAHAM HOLLAND

Finnegan, Henderson & Farabow
ATTORNEYS

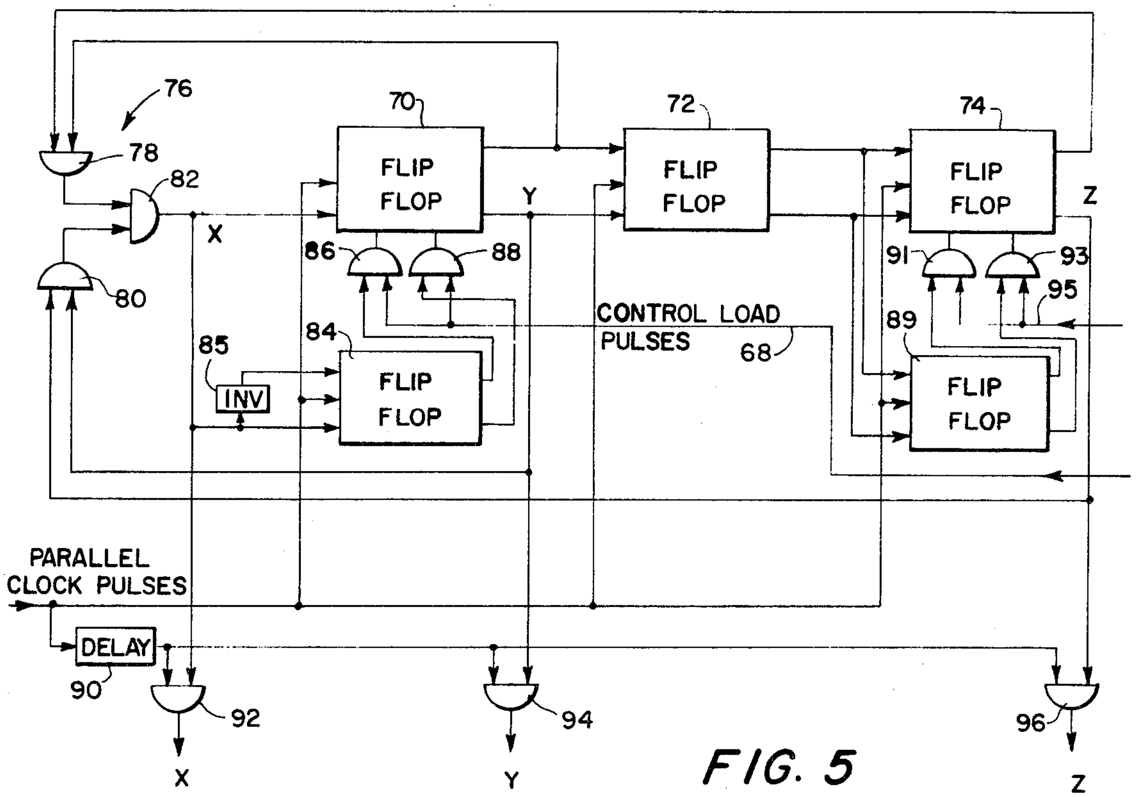
FIG. 5
TABLE I
| X | Y | Z |
|---|---|---|
| 1 | 0 | 0 |
| 0 | 1 | 0 |
| 1 | 0 | 0 |
| 1 | 1 | 1 |
| 0 | 1 | 0 |
| 0 | 0 | 1 |
| 0 | 0 | 1 |
TABLE II
| X | Y | Z |
|---|---|---|
| 1 | 0 | 0 |
| 0 | 1 | 0 |
| 0 | 1 | 0 |
| 0 | 0 | 1 |
| 0 | 0 | 1 |
| 1 | 0 | 0 |
| 0 | 1 | 0 |
FIG. 6
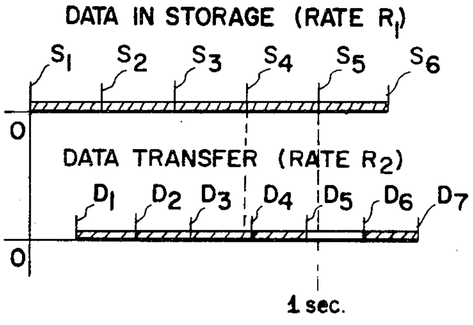
FIG. 11
INVENTOR
GRAHAM HOLLAND
Finnegan, Henderson & Farabow
ATTORNEYS

INVENTOR
GRAHAM HOLLAND

Finnegan, Henderson & Farabow
ATTORNEYS

INVENTOR
GRAHAM HOLLAND

Finnegan, Henderson & Farabow
ATTORNEYS

INVENTOR

GRAHAM HOLLAND

Finnegan, Henderson & Farabow

ATTORNEYS

INVENTOR
GRAHAM HOLLAND

Finnegan, Henderson & Farabow
ATTORNEYS

MULTIPLEX COMMUNICATION SYSTEM

The present invention relates to a multiplex communication system for transmitting data and control information from a plurality of communication channels to a plurality of receiving channels by time division multiplex methods and, more particularly, relates to an improved method of and apparatus for transmitting data and control information which provides a series of time intervals for the transmission of data information in which there periodically appears an open time interval that is available for the transmission of control information.

In the communication system, first and second multiplexers may be located at separate communication stations to enable the system to perform time division multiplex communication. The circuitry of each multiplexer includes a transmitting section for combining information signals from the communication channels into a series of transmission time frames containing information signals from each of the communication channels and a receiving section for separating a received transmission time frame into its information signals and applying the information signals to the corresponding receiving channels.

In the operation of the system, a succession of transmission time frames is generated by the transmitting section of the multiplexer. The succession of transmission time frames consists of a series of transmission time frames containing only data information in which there periodically appears a transmission time frame containing only control information. A first aspect of the present invention is the method by which the above arrangement of data and control information is achieved.

The periodic appearance of a transmission time frame containing control information in the series of transmission time frames is the result of the method of multiplex transmission of the present invention. In accordance with the invention, this method includes the initial steps of sampling data signals from the communication channels at a first repetition rate and transferring the sampled data signals into serial arrangement at a second repetition rate which exceeds the first repetition rate. The second repetition rate defines a series of time intervals for the transmission of data signals sampled from the communication channels. Since the data signals are transferred at a faster rate than they are sampled, there periodically appears an open time interval in the second repetition rate in which no new data is available to be transferred into serial arrangement so that the open time interval is available for the transmission of control signals.

In further steps of the method, the serially arranged data signals are transmitted as a succession of transmission time frames which occur in the series of time intervals defined by the second repetition rate until the occurrence of the open time interval. When the open time interval occurs, a set of control signals from the communication channels is transmitted in a transmission time frame during that time interval. Since the control information is transmitted in a time interval which is not required for the transmission of data signals, the effective rate at which data signals are sampled and transmitted is not diminished by the periodic transmission of control signals. Thus, by conserving the amount of time required for the transmission of data information the method of multiplex transmission of the present invention utilizes available transmission time efficiently to transmit both data and control information.

A second aspect of the invention is the method by which the transmission time frames which contain data information are distinguished from the transmission time frames which contain control information. In accordance with the invention, a set of frame identification signals is transmitted with the information signals of each transmission time frame. The frame identification signals are varied in accordance with a predetermined signal pattern so that successive transmission time frames contain different combinations of frame identification signals. During the transmission of time frames containing data information, the combination of frame identification signals is varied in the normal sequence established by the predetermined signal pattern. When a transmission time frame containing control information is transmitted, however, the combination of frame identification signals is altered from the normal sequence of the signal pattern to identify the transmission time frame as one which contains control information. Thus, when a succession of transmission time frames arrive at the receiving section of the multiplexer, transmission time frames with control information can be distinguished from those with data information by determining when the received combinations of frame identification signals deviate from the normal sequence of the predetermined signal pattern.

To provide the frame identification signals, the transmitting section of the multiplexer has a first signal generator for producing a combination of output signals which vary in accordance with a predetermined pattern of signals. The output signals of this generator are added to the information signals from the communication channels to form transmission time frames which contain both information signals and frame identification signals. The signal generator is also provided with circuitry for changing the combination of output signals from the predetermined signal pattern when a transmission time frame containing control information is to be transmitted. The receiving section of the multiplexer has a second signal generator which operates in synchronism with the first signal generator and produces output signals in accordance with the same predetermined signal pattern as the first signal generator in the transmitting section of the multiplexer. The receiving section also contains comparator circuitry for comparing the output signals of the second signal generator with the frame identification signals which are received in the succession of transmission time frames. The comparator circuitry is used to determine when the received combination of frame identification signals deviates from the normal sequence of the predetermined signal pattern and, thus, to identify a transmission time frame containing control information.

In addition to distinguishing transmission time frames containing data information from transmission time frames containing control information, the frame identification signals may be used to maintain synchronism between the transmitting and receiving sections of multiplexers which are performing communication operations. The synchronization function is achieved by establishing a predetermined relationship in the combination of frame identification signals produced by the signal generator of the transmitting section and testing received combinations of frame identification signals in the receiving section to determine whether the predetermined relationship is satisfied.

The accompanying drawings illustrate a preferred embodiment of the invention and, together with the description, serve to explain the principles of the invention.

OF THE DRAWINGS

FIG. 5 is a block diagram of a signal generator used in the transmitting section of the multiplexer;

Figure 7:
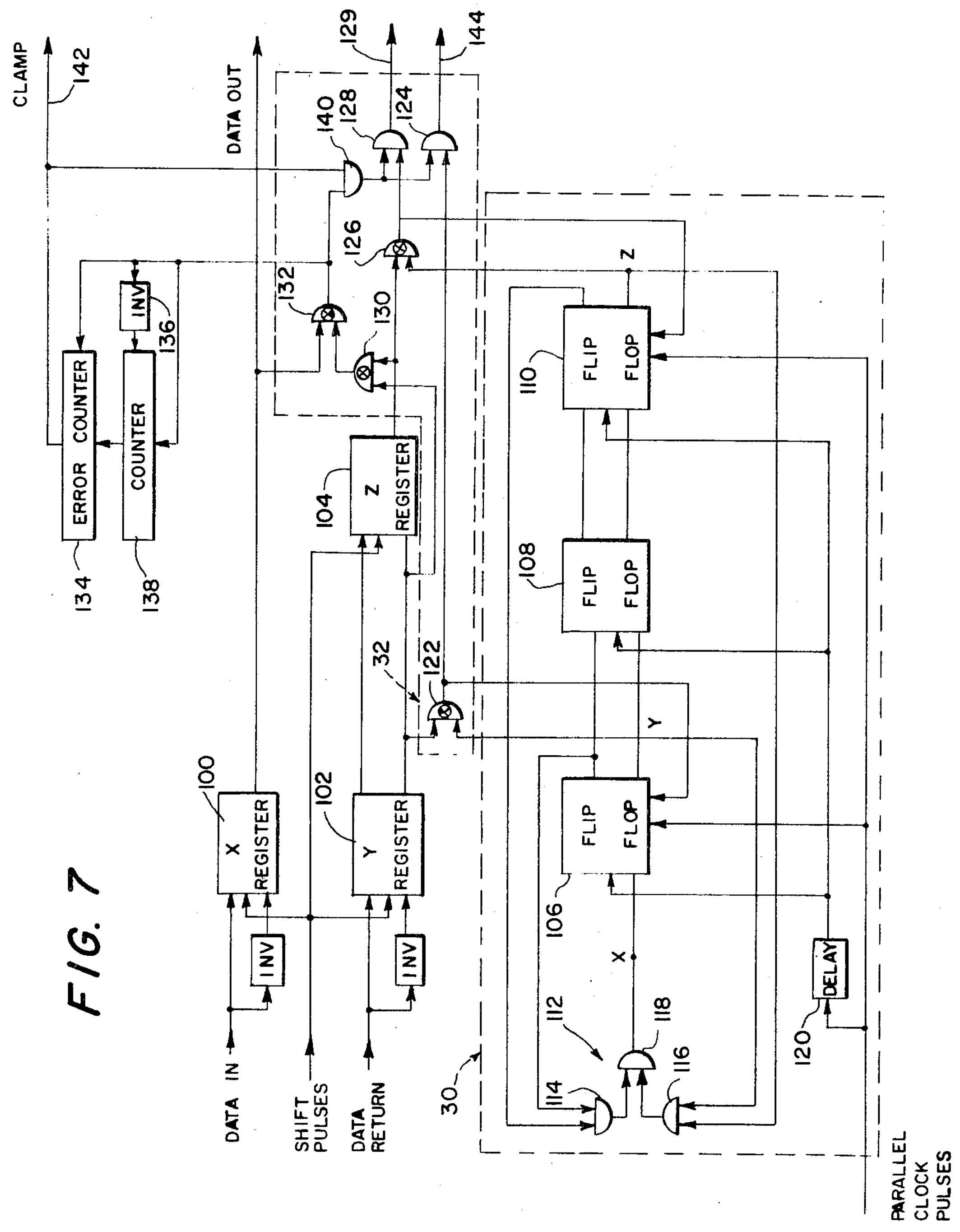
Figure 8:
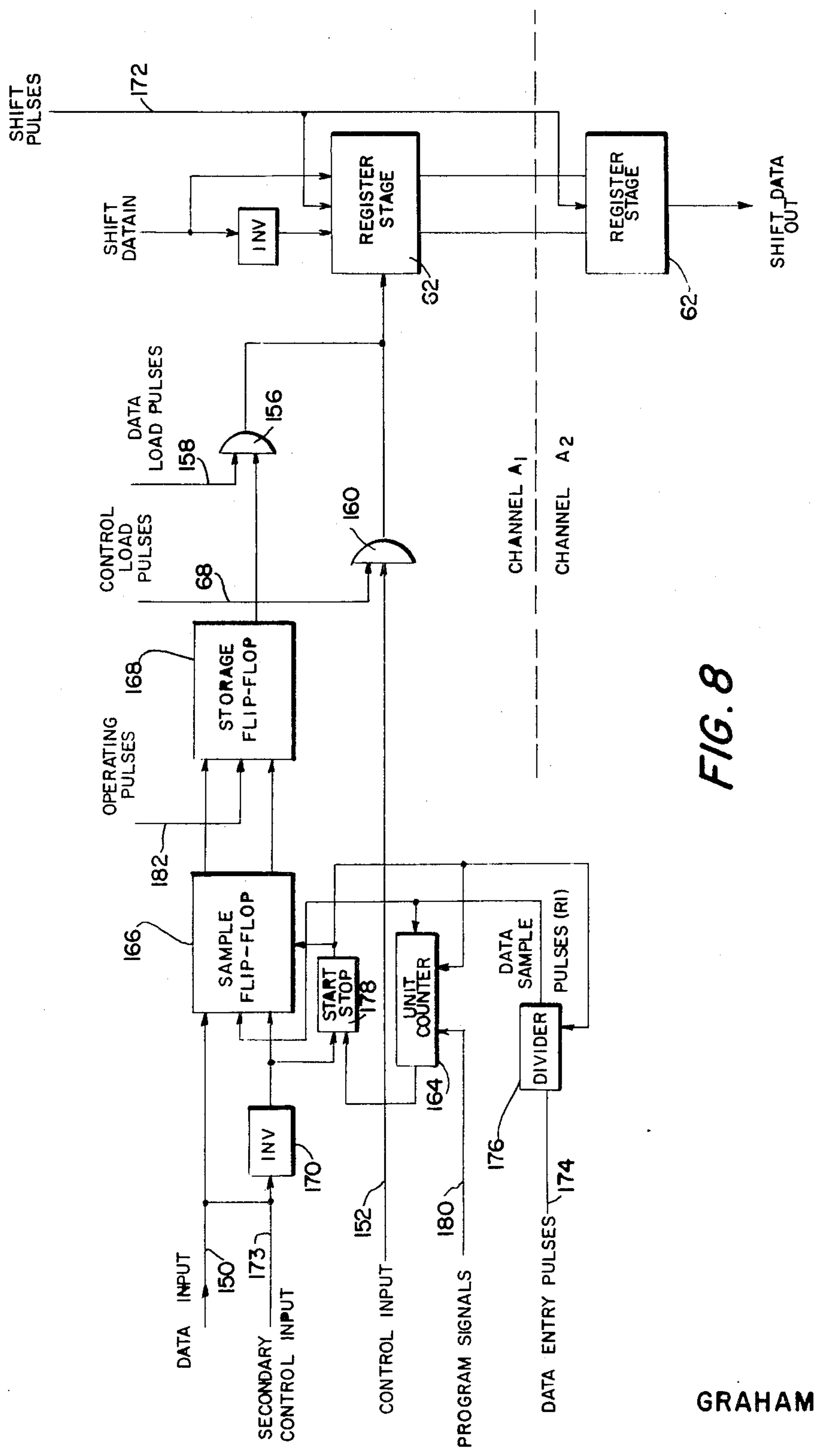
Figure 9:
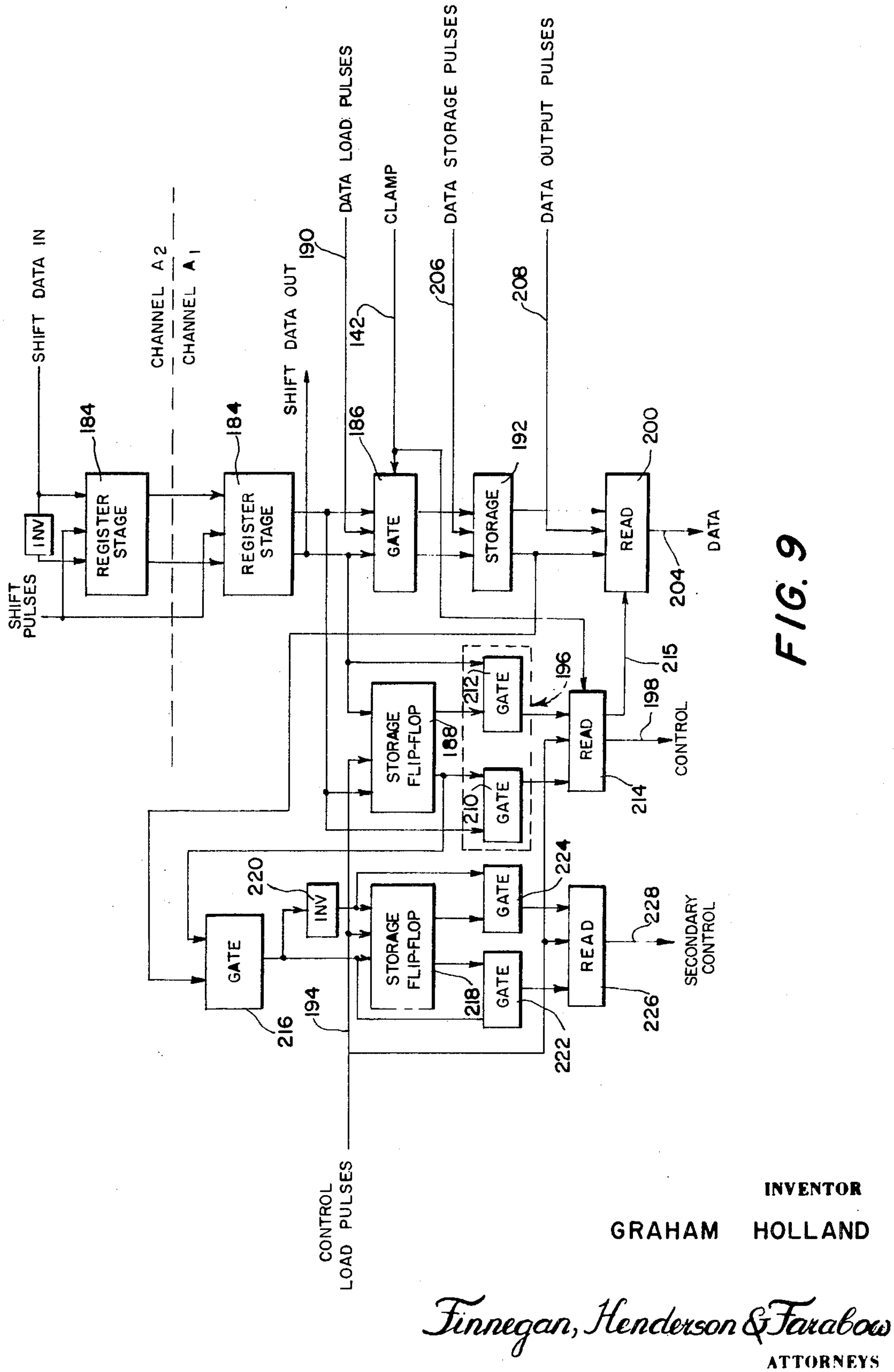
Figure 10:
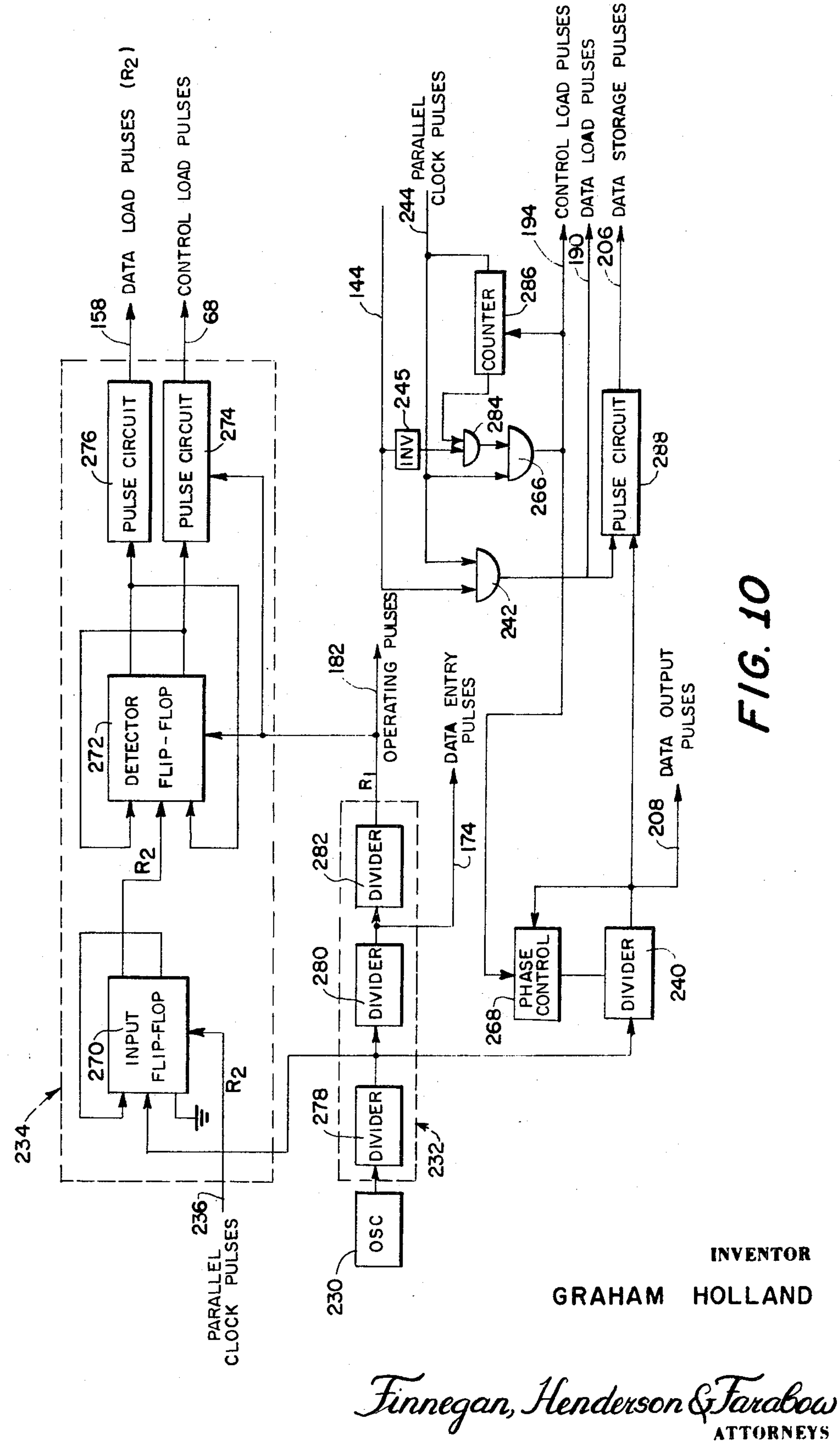

FIG. 6 consists of tables I and II which illustrate the sequence of signals generated by the signal generator of FIG. 5;

FIG. 7 is a block diagram of a signal generator and comparator circuit located in the receiving section of the multiplexer;

FIG. 8 is a block diagram of a portion of the transmitting section of the multiplexer which is used to sample data and control signals from a communication channel;

FIG. 9 is a block diagram of a portion of the receiving section of the multiplexer which is used to apply received data and control signals to a receiving channel;

FIG. 10 is a block diagram of a portion of the multiplexer circuitry which controls the timing of operations in the transmitting and receiving sections; and FIG. 11 is a graph illustrating the time sequence of the sampling and transfer functions in the transmitting section of the multiplexer.

GENERAL DESCRIPTION OF PREFERRED EMBODIMENT

Figure 1:
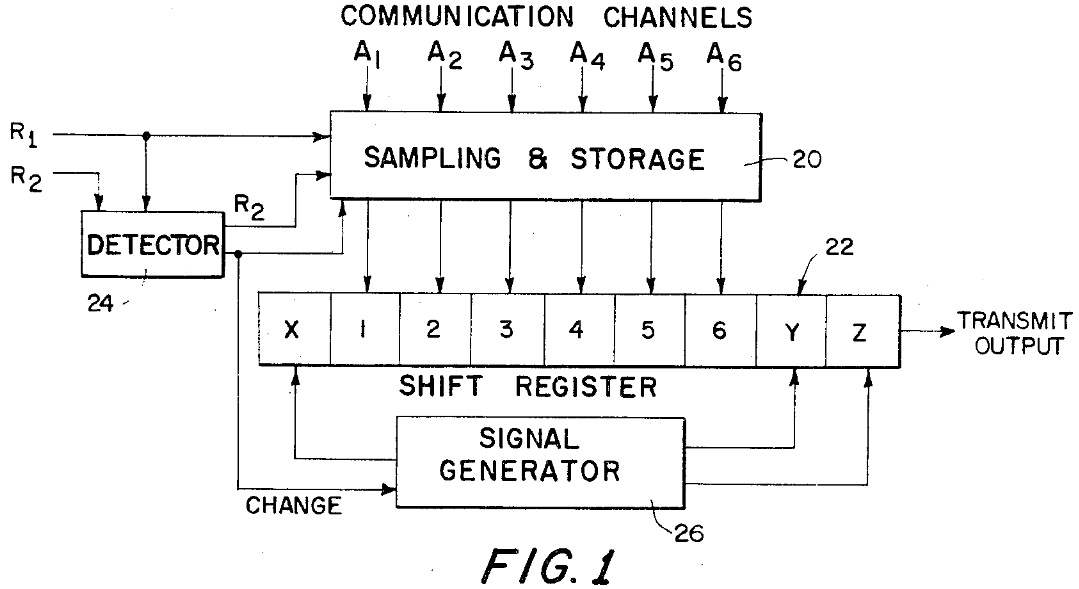
FIG. 1 is a block diagram which illustrates the basic operating characteristics of the transmitting section of the multiplex communication system of the present invention.

In FIG. 1, the basic principles of operation of the transmitting section of the multiplex communication system of the present invention are set forth in simple form. At the transmitting section of a multiplexer, information in the form of data signals is applied to a sampling and storage device 20 from a plurality of communication channels $A_1$–$A_6$, inclusive. The data signals are sampled and stored in the device at a first repetition rate $R_1$. The stored data signals are transferred at a second repetition rate $R_2$ to stages of a shift register 22, corresponding in number to the communication channels.

In accordance with the invention, the repetition rate $R_1$ at which data signals are sampled from the communication channels and stored in the transmitting section is less than the repetition rate $R_2$ at which the stored data signals are transferred from storage and applied to the stages of the shift register. Repetition rate $R_2$ defines a series of time intervals which are used for the transmission of data signals from the multiplexer. Since repetition rate $R_2$ exceeds repetition rate $R_1$, there periodically occurs an open time interval in the series of intervals defined by repetition rate $R_2$ in which no new data is available to be transferred from storage into the shift register. The occurrence of this open time interval is detected by a detecting circuit 24 in the transmitting section which operates circuitry during the open time interval to apply control signals instead of data signals to the stages of the shift register.

In a preferred embodiment of the invention, shift register 22 contains additional register stages X, Y, and Z which are connected to the outputs of a signal generator 26. The signal generator produces combinations of output signals which vary in accordance with a predetermined signal pattern. These output signals are applied to register stages X, Y, and Z to provide frame identification signals. The frame identification signals and the data signals transferred into the stages of the shift register are shifted through the register and transmitted from the multiplexer in the form of a transmission time frame containing both frame identification signals and data information (FIG. 2).

Figure 2:
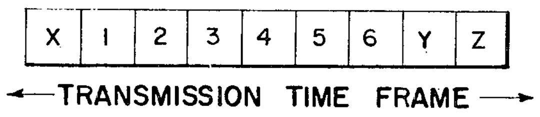
FIG. 2 illustrates the form of a transmission time frame in which information is transmitted by the multiplex communication system.

Referring to FIG. 2, the transmission time frame contains X-, Y-, and Z-frame identification signals and a series of information signals from the communication channels $A_1$–$A_6$, inclusive. The frame identification signals are preferably separated in the transmission time frame to avoid having all frame identification signals affected by momentary interference with transmitting operations. As shown in FIG. 2, the Y- and Z-frame identification signals may be located at the beginning of the transmission time frame and the X-frame identification signal at the end of the transmission time frame. The method of the present invention is not limited, however, to the particular arrangement of frame identification signals shown in FIG. 2, and other arrangements of frame identification signals may be used. For example, the Y-frame identification signal may be located at the end of the transmission time frame with the X-frame identification signal without significantly changing the operation of the communication system.

In the sampling of data signals from the communication channels, signal generator 26 (FIG. 1) is allowed to produce its normal sequence of frame identification signals to indicate transmission time frames which contain data information. When the open time interval in repetition rate $R_2$ is detected, however, the combination of output signals from the generator is altered to change the combination of frame identification signals appearing in register stages X, Y, and Z to indicate a transmission time frame which contains control information rather than data information.

Figure 3:
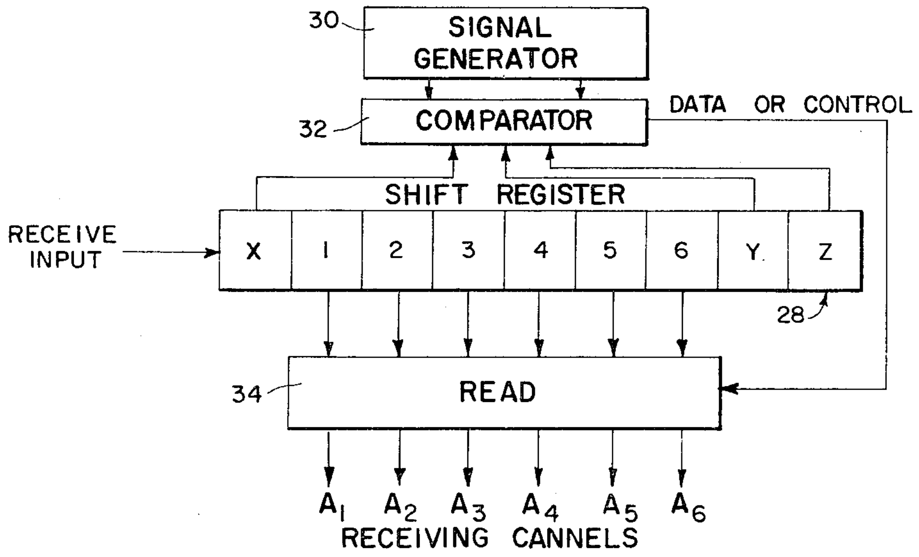
FIG. 3 is a block diagram illustrating the basic operating characteristics of the receiving section of the system.

In FIG. 3, the basic operating principles of the receiving section of the multiplex communication system are illustrated. At the receiving section of the multiplexer, the frame identification signals and information signals of a transmission time frame are applied to the stages of a shift register 28. The received frame identification signals are applied to X-, Y-, and Z-stages of shift register 28 and are compared with the output signals of a signal generator 30 operating in synchronism with signal generator 26 by a comparator circuit 32 to determine whether the transmission time frame contains data or control information. When the received transmission time frame contains data information, comparator circuit 30 produces a data output signal to operate a first gate arrangement in a read circuit 34 which transfers the data signals from the stages of the shift register to a plurality of receiving channels $A_1$–$A_6$, which correspond to the communication channels. When the received transmission time frame contains control information, the comparator circuit produces a control output signal to operate a second gate arrangement in the read circuit to transfer the control signals to the receiving channels.

From the above description it can be understood that the form of the signals transmitted by the multiplexer is a series of transmission time frames containing data information in which there periodically appears a transmission time frame containing control information. Each transmission time frame includes both frame identification signals (X, Y, and Z) and information signals, which are either data signals or control signals. During repetitions of transmission time frames which contain only data information, the combination of X-, Y-, and Z-signals is varied in a sequence determined by the predetermined signal pattern. When the transmission time frame contains control information, however, the combination of X-, Y-, and Z-signals, is altered from the normal sequence of signals to indicate that control information is present in the transmission time frame.

In the following detailed description of the present invention, a communication system which is embodied as a hardware component arrangement is disclosed. The principles of the invention are not limited, however, to a particular hardware arrangement and, for example, may be performed by a computer utilizing software techniques.

DETAILED DESCRIPTION OF PREFERRED EMBODIMENT

Figure 4A:
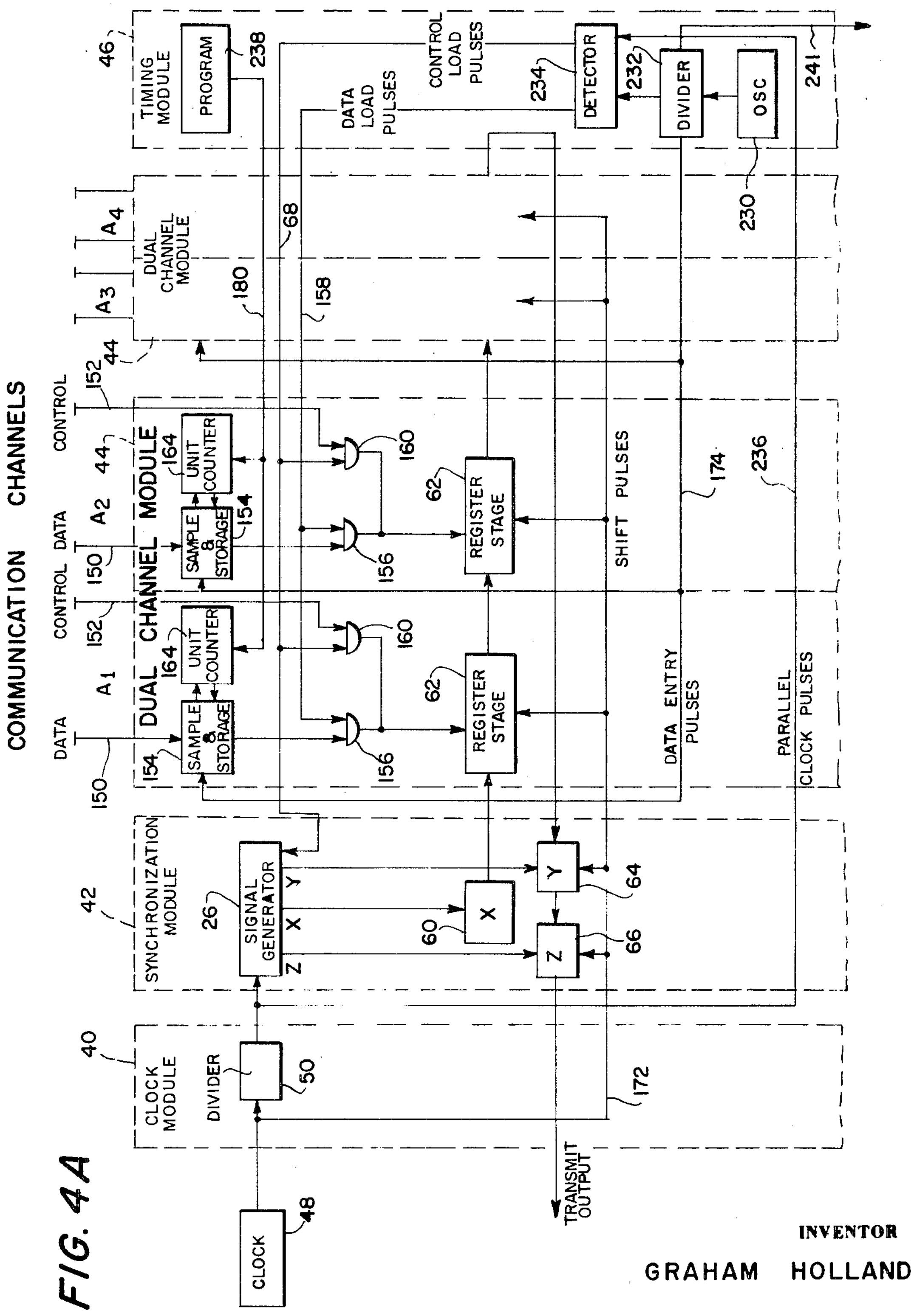
FIG. 4A is a block diagram of the transmitting section of a multiplexer which operates in accordance with the method of the present invention to sample data and control signals from a plurality of communication channels.
Figure 4B:
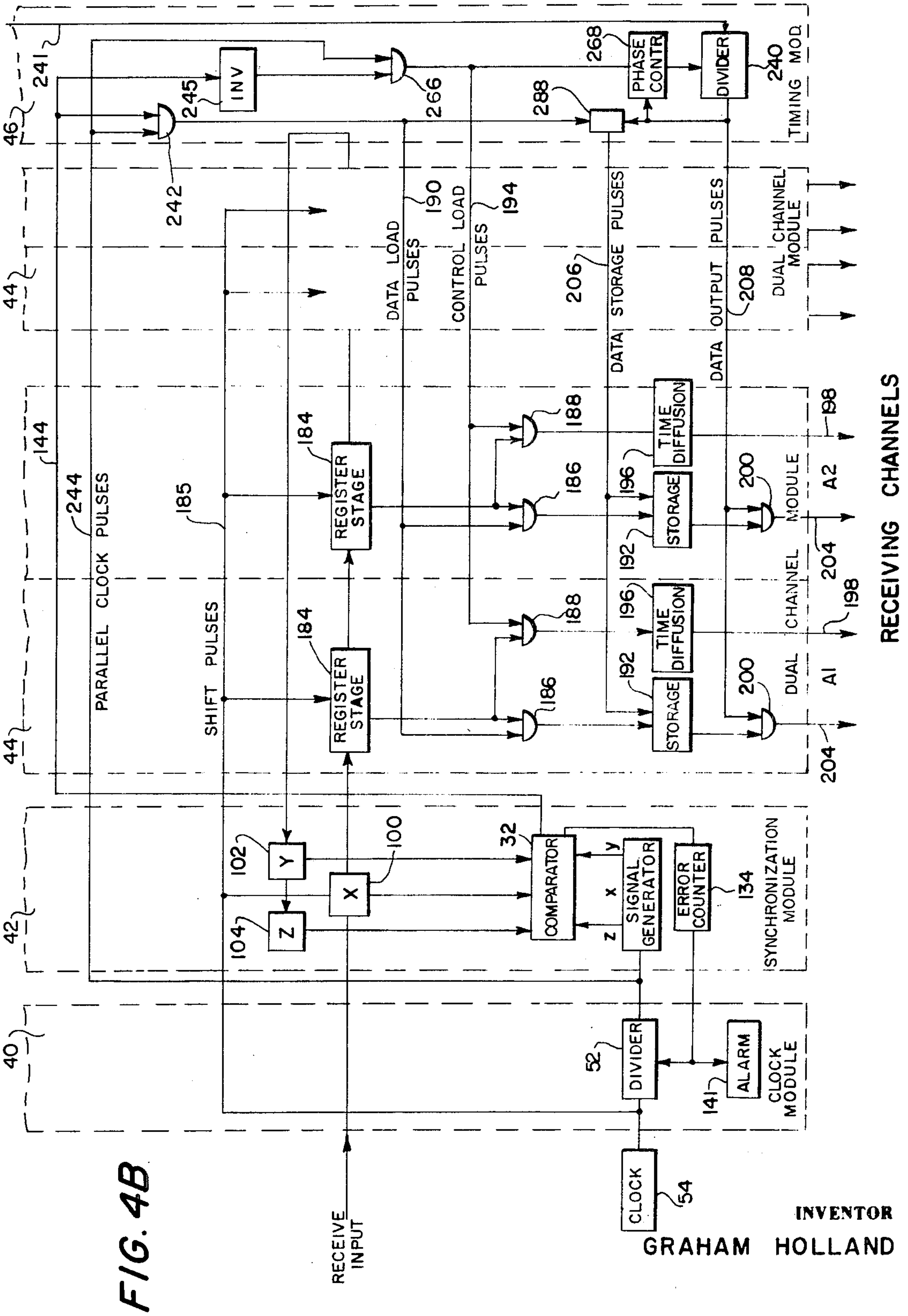
FIG. 4B is a block diagram of the receiving section of a multiplexer which operates in accordance with the method of the present invention to apply received data and control signals to a plurality of receiving channels.

As shown in FIGS. 4A and 4B, a multiplexer which operates in accordance with the principles of the present invention can be constructed as a plurality of modules in which the components of the multiplexer circuitry are assembled. The modules may be arranged in adjacent positions to form the circuitry of the multiplexer. The multiplexer includes a clock module 40, a synchronization module 42, a set of dual channel modules 44—44, and a timing module 46. Clock module 40 provides timing pulses for the transmitting and receiving sections of the multiplexer which are derived from external sources of clock pulses. Synchronization module 42 includes a transmitting section (FIG. 4A) which provides the frame identification signals for transmission time frames in which information signals are transmitted from the multiplexer. It also includes a receiving section (FIG. 4B) for identifying the frame identification signals in a received transmission time frame. The dual channel modules 44—44 have transmitting sections (FIG. 4A) for sampling data and control information from a plurality of communication channels. Receiving sections of modules 44—44 (FIG. 4B) apply data and control information to a plurality of corresponding receiving channels. As shown in FIGS. 4A and 4B, the multiplexer includes two dual channel modules which perform transmitting and receiving operations for communication and receiving channels, $A_1$, $A_2$, $A_3$, and $A_4$. If it is desired to provide multiplex communication for additional channels, the number of dual channel modules can be increased to provide additional transmitting and receiving capacity for the multiplexer. Timing module 46 provides timing pulses which control the operation of multiplexer components located in the transmitting and receiving sections of the synchronization module and the dual channel modules.

CLOCK MODULE

Clock module 40 provides timing pulses for the transmitting and receiving sections of multiplexer. An external source 48 (FIG. 4A) of clock pulses is connected to a first frequency divider 50 in the clock module. Source 48 applies transmit-timing pulses to frequency divider 50 which provides parallel clock pulses occurring at a frequency which is a fraction of the frequency of the transmit-timing pulses. The parallel clock pulses of frequency divider 50 and the transmit-timing pulses from source 48 are used in timing the operations of multiplexer components in the transmitting sections of synchronization module 42 and dual channel modules 44—44.

Clock module 40 also contains a second frequency divider 52 (FIG. 4B) to which receive-timing pulses are applied from a second external source 54 of clock pulses. Frequency divider 52 produces parallel clock pulses which occur at a frequency which is a fraction of the frequency of the receive-timing pulses. These parallel clock pulses and the receive-timing pulses operate multiplexer components in the receiving sections of synchronization module 42 and dual channel modules 44—44.

SYNCHRONIZATION MODULE

Referring to FIG. 4A, synchronization module 42 has a transmitting section which includes a first signal generator 26. Parallel clock pulses from frequency divider 50 are applied to the signal generator which provides a combination of output signals (X, Y, and Z) which vary in accordance with a predetermined signal pattern. The combination of X-, Y-, and Z-output signals is changed each time a parallel clock pulse is applied to signal generator 26 from the frequency divider 50. The X-output of the signal generator is connected to a first stage 60 of a shift register which includes additional register stages 62—62 located on the dual channel modules.

The transmitting section of synchronization module 42 also includes a register stage 64 which is connected to the Y-output of signal generator 26, and a register stage 66 which is connected to the Z-output of the signal generator. As shown in FIG. 4A, the signal generator is provided with an input terminal connected to a line 68 from timing module 46. An input pulse is applied to this terminal on line 68 when a transmission time frame containing control information is to be transmitted to change the Y-output signal of generator 26. The circuitry for changing the Y-output signal of the generator is described below.

The circuitry of signal generator 26 is shown in detail in FIG. 5. The circuitry includes three flip-flops 70, 72, and 74 which are connected in series and an exclusive-OR logic circuit 76 which includes three AND-gates 78, 80, and 82. Gate 82 of the exclusive-OR circuit provides the X-output signal of the generator. The output of flip-flop 70 provides the Y-output signal of signal generator 26 and the output of flip-flop 74 provides The Z-output signal of the signal generator. The Y-output of flip-flop 70 is connected to a first input terminal of AND-gate 80, and the Z-output of flip-flop 74 is connected to a second input terminal of AND-gate 80. In addition, the remaining output terminals of flip-flops 70 and 74 are connected to input terminals of AND-gate 78. The output terminal of gate 82, i.e., the output of the exclusive-OR circuit 76, is connected to an input terminal of flip-flop 70. The parallel clock pulses of frequency divider 50, illustrated in FIG. 4A, are applied to operating terminals of flip-flops 70, 72, and 74 to enable the flip-flops to be set in accordance with the signals applied to their input terminals.

The signal generator is also provided with an additional flip-flop 84 which serves as a storage device. Flip-flop 84 has a first input terminal connected directly to the output terminal of gate 82 and a second input terminal connected through an inverter 85 to the output terminal of gate 82. The output terminals of flip-flop 84 are connected to input terminals of a pair of AND-gates 86 and 88, the output terminals of which are connected to set and reset terminals, respectively, of flip-flop 72. Control line 68 from the timing module is also connected to input terminals of gates 86 and 88. The purpose of flip-flop 84 is to store the X-output signal provided gate 82 at the time that the signal is shifted into flip-flop 70. It should be noted that parallel clock pulses from frequency divider 50 are also applied to an operating terminal of flip-flop 84 to enable the flip-flop to receive signals from gate 82 at the same time that flip-flops 70, 72, and 74 are enabled by the parallel clock pulses to respond to signals applied at their input terminals. If a control load pulse is applied to line 68, the state of flip-flop 70 is reversed to change the Y-output signal of generator 26. At the same time, the X-output of the generator is also changed.

As shown in FIG. 5, the signal generator also includes a flip-flop 89 having input terminals which are connected to the output terminals of flip-flop 72. The output terminals of flip-flop 89 are connected to input terminals of a pair of AND-gates 91 and 93. The output terminals of AND-gates 91 and 93 are connected to set and reset terminals, respectively, of flip-flop 74. A control line 95 is connected to input terminals of gates 91 and 93 for applying operating pulses to the gates. The origin of the operating pulses for gates 91 and 93 is described at a later point in this specification. The purpose of flip-flop 89 is similar to the purpose of flip-flop 84. Flip-flop 89 serves as a storage device to store the output signal of flip-flop 72 at the time that the signal is shifted into flip-flop 74. Parallel clock pulses (from frequency divider 50, illustrated in FIG. 4A) are applied to an operating terminal of flip-flop 89 to enable the flip-flop to receive signals from the flip-flop 72 at the same time that flip-flops 70, 72, and 74 are operated by the parallel clock pulses. If an operation pulse is applied to line 95 to operate gates 91 and 93, the state of flip-flop 74 is reversed to change the Z-output signal of generator 26 (FIG. 4A). The change in the Z-output signal results in a change in the X-output signal of the generator.

In the normal operation of signal generator 26, i.e., when data information is sampled from the communication channels, parallel clock pulses are applied to the signal generator from frequency divider 50. The signal generator provides a combination of output signals (X, Y, and Z) which changes each time a parallel clock pulse is applied. The combination of output signals varies in a sequence set forth in table 1 (FIG. 6). As shown in table I, the X-output signal is the exclusive-OR function of the Y- and Z-output signals. As a result of this relationship of the X-, Y-, and Z-output signals, the X-output signal constitutes a parity signal for the Y- and Z-output signals. The parity relationship is used to maintain synchronism and is explained in detail in the description of the receiving section of the synchronization module. Referring to FIG. 4A, the X-, Y-, and Z-output signals are applied to register stages 60, 64, and 66, respectively, to indicate transmission time frames which contain data information.

When a transmission time frame containing control information is to be transmitted, a control load pulse appears on line 68 (FIG. 5). The source of the control load pulse on line 68 is explained below in the discussion of the timing module. This pulse operates gates 86 and 88 so that an input signal if applied to flip-flop 70 from flip-flop 84 to reverse the existing state of flip-flop 70. The reversal in the state of flip-flop 70 occurs because flip-flop 84 acts as a storage device and records the state to which flip-flop 70 has been set by its previous input signal. Flip-flop 84 applies an input signal to either gate 86 or gate 88, in accordance with the recorded flip-flop state, to effect reversal of flip-flop 70 when a control load pulse is applied to line 68. As a result, the Y-output signal of generator 26 (FIG. 4A) is changed and, simultaneously, the X-output signal is also changed because the X-output signal is the exclusive-OR function of the Y- and Z-output signals. Thus, a combination of X-, Y-, and Z-output signals which deviates from the signal pattern set forth in table I (FIG. 6) is applied to register stages 60, 64 and 66 to indicate that the transmission time frame contains control information rather than data information.

Referring to table II of FIG. 6, the combinations of frame identification signals produced by generator 26 when data and control information is transmitted by the multiplexer are illustrated. Assuming that control information is to be transmitted in the third transmission time frame, generator 26 is allowed to operate in its normal sequence during the first and second transmission time frames to produce the X-, Y-, and Z-signal combinations, 1, 0, 0 and 0, 1, 0, respectively, to indicate that the first and second transmission time for example, data information. In the third transmission time frame, the X- and Y-signals are changed from the normal sequence so that the X-, Y-, and Z-signal combination 0, 1, 0 appears instead of the combination 1, 0, 0 to indicate the transmission time frame contains control information. Thereafter, the generator continues to operate in its normal sequence to indicate the subsequent transmission time frames contain data information. As shown in table II, the parity relationship of the X-, Y-, and Z-signals is satisfied in all instances.

The signal generator illustrated in FIG. 5 is provided with a time delay 90 to which parallel clock pulses from frequency divider 50 are applied. The output of time delay 90 is connected to gates 92, 94, and 96 to which the X-, Y, and Z-output signals are applied, respectively. The purpose of time delay 90 is to allow the flip-flops 70, 72, and 74 and the exclusive-OR circuit 76 to be set to their new states before applying the X-, Y-, and Z-outputs to register stages 60, 64, and 66.

The receiving section of synchronization module 22, as illustrated in FIG. 5B, includes second signal generator 30. During communication with another multiplexer, signal generator 30 is operated in synchronism with the signal generator in the transmitting section of the other multiplexer. Signal generator 30 is similar in operation to signal generator 26 in that it provides a combination of X-, Y-, and Z-output signals which vary in accordance with the predetermined signal pattern of table I (FIG. 6). As shown in FIG. 4B, the Y- and Z-output signals of signal generator 30 are applied to comparator circuit 32. The receiving section of the synchronization module also includes X-, Y-, and Z-register stages 100, 102, and 104, respectively, for receiving the frame identification signals of a transmission time frame. Register stages 100, 102, and 104 are stages of a shift register which includes additional register stages on dual channel modules 44—44. When a transmission time frame is received and applied to the stages of the shift register, register stages 100, 102, and 104 contain frame identification signals. Comparator circuit 32 compares the signals contained in register stages 102 and 104 with the Y- and Z-output signals of generator 30 and it performs a synchronization test, explained below, on the received frame the identification signals.

Signal generator 30 and comparator circuit 32 are shown in detail in FIG. 7. The signal generator includes three flip-flops 106, 108, and 110 which are connected in series and an exclusive-OR circuit 112 including AND-gates 114, 116, and 118. Flip-flop 106 provides the Y-output signal of generator 30 and flip-flop 110 provides the Z-output signal of the generator. The X-output signal is provided by gate 118 of exclusive-OR circuit 112. Parallel clock pulses from frequency divider 52 (illustrated in FIG. 4B) are applied to operating terminals of flip-flops 106, 108, and 110 through a time delay 120. The pulses applied to flip-flops 106, 108, and 110 enable the flip-flops to be set by signals appearing at their input terminals. In the normal operation of generator 30 by the parallel clock pulses from frequency divider 52, the X-, Y-, and Z-output signals vary in accordance with table I (FIG. 6).

As illustrated in FIG. 7, comparator circuit 32 of synchronization module 42 includes an exclusive-OR circuit 122. The Y-output of flip-flop 106 is connected to a first input terminal of exclusive-OR circuit 122 and the output of register stage 102 (Y-register stage) is connected to a second input terminal of exclusive-OR circuit 122. The function of exclusive-OR circuit 122 is to compare the Y-output signal from generator 30 with the received frame identification signal located in register stage 102. Exclusive-OR circuit 122 provides no output signal when its input signals are identical, but it provides an output signal to a gate 124 when the compared input signals are different. The output of exclusive-OR circuit 122 is also applied to a reset terminal of flip-flop 106 to reset the flip-flop when there is a difference in the compared input signals.

The comparator circuit also includes an exclusive-OR circuit 126 for comparing the Z-output signal of generator 30 with the received frame identification signal in register stage 104 (Z-register stage). The Z-output of flip-flop 110 is applied to a first input terminal of exclusive-OR circuit 126 and the output of register stage 104 is applied to a second input terminal of the exclusive-OR circuit. In the event that the compared signals are identical, exclusive-OR circuit 126 provides no output. If the compared signals are different, however, exclusive-OR circuit 126 produces an output signal which is applied to a gate 128 having its output terminal connected to a line 129. The purpose of line 129 is described at a later point in this specification. The output of exclusive-OR circuit 126 is also applied to a reset terminal of flip-flop 110 to reset the flip-flop when the input signals to the exclusive-OR circuit are different.

The comparator circuit of the synchronization module is also provided with exclusive-OR circuits 130 and 132 (FIG. 7). These exclusive-OR circuits perform a synchronization test on the received frame identification signals which are located in X-, Y-, and Z-register stages 100, 102, and 104. As shown in FIG. 7, the outputs of the Y- and Z-register stages are applied to the input terminals of exclusive-OR circuit 130. Exclusive-OR circuit 130 provides an output only when its input signals are different. The output of exclusive-OR circuit 130 is applied to an input terminal of exclusive-OR circuit 132. The output of the X-register stage is also applied to an input terminal of exclusive-OR circuit 132. Exclusive-OR circuit 132 provides an output signal only in the case when its input signals are different.

The synchronization test performed by the exclusive-OR circuits 130 and 132 utilizes the parity relationship of the X-, Y-, and Z-output signals established by generator 26 in the transmitting section of the synchronization module. Referring to table I (FIG. 6), which sets forth the X-, Y-, and Z-signal combinations used to identify transmission time frames containing data information, it can be seen that the X-output signal constitutes a parity signal for the Y- and Z-output signals. As indicated in table I, in the parity relationship of the X-, Y-, and Z-signals the X-signal is made a function of the Y- and Z-signals such that the number of 0 signals which appear in the X-, Y-, and Z-combination is always even, i.e., either none or two. Exclusive-OR circuits 130 and 132 test the X-, Y-, and Z-combination for parity and, if the parity relationship is not satisfied, exclusive-OR circuit 132 produces an output signal. When the parity relationship is satisfied, however, exclusive-OR circuit 132 produces no output signal.

The output of exclusive-OR circuit 132 is applied directly to an error counter 134 and, through an inverter 136 to another counter 138. The output of exclusive-OR circuit 132 is also connected to a first input terminal of a gate 140. Error counter 134 is designed to provide an output signal when it registers a predetermined count. The output of error counter 134 is applied to a line 142 which is connected to a second input terminal of gate 140.

When the parity relationship is satisfied in the X-, Y-, and Z-signal combination and no output signal appears at exclusive-OR circuit 132 an input signal is applied through inverter 136 to counter 138. These 138 Counter the number of consecutive times that a combination of X-, Y-, and Z-signals satisfying the parity relationship is received. When an output signal appears at exclusive-OR circuit 132 to indicate that the parity relationship is not satisfied, an input signal is applied to error counter 134 to register the occurrence of an error in the parity relationship of the X-, Y-, and Z-signals. The appearance of an error in the parity relationship indicates that the receiving section of the multiplexer may be out of synchronism with the transmitting section of another multiplexer from which it is receiving information. At the same time, the output signal of exclusive-OR circuit 132 resets counting circuit 138 to its start position.

Counter 134 provides an output signal after counting five consecutive errors in the parity relationship. When five consecutive errors are counted, the output signal from error counter 134 activates gate 140 which applies a signal to input terminals of gates 124 and 128 to inhibit the gates from responding to signals from the exclusive-OR circuits 122 and 126, respectively. Referring to FIG. 4B, the output signal of the error counter also operates an alarm 141 in the clock module.

In the operation of the receiving section of the multiplexer, the frame identification signals of the received transmission time frame are applied to register stages 100, 102, and 104 illustrated in FIG. 7. If the received transmission time frame contains data information, the frame identification signal located in register stage 102 is identical to the Y-output of flip-flop 106 so that exclusive-OR circuit 122 produces no output signal. Similarly, the frame identification signal in register stage 104 is identical to the Z-output signal of flip-flop 110 so that exclusive-OR circuit 126 produces no output signal. Since the parity relationship of the frame identification signals in register stages 100, 102, and 104 is satisfied, exclusive-OR circuit 132 produces a negative output signal which is applied to inverter 136 to provide a positive pulse at the input of counting circuit 138. Thus, counter 138 registers the occurrence of a combination of frame identification signals in which the parity relationship is satisfied.

In the event that a transmission time frame received by the multiplexer contains control information, the X-, Y-, and Z-combination of received frame identification signals in register stages 100, 102, and 104 differs from the combination of X-, Y-, and Z-signals produced by signal generator 32 since the X- and Y-frame identification signals have been altered from the predetermined signal pattern. As shown in table II (FIG. 6), the parity relationship of the X-, Y-, and Z-frame identification signals is still satisfied, however, so that no error signal is produced by the exclusive-OR circuit 132. The occurrence of the combination of frame identification signals indicating that control information has been received is thus registered in counter 138. A difference between the received frame identification signal in the Y-register stage, i.e., stage 102, and the Y-output signal of generator 30 is detected by exclusive-OR circuit 122. The exclusive-OR circuit produces an output signal which activates gate 124 (normally uninhibited) to provide an output signal indicating that the received transmission time frame contains control information. The output signal from gate 124 is applied to a line 144. As shown in FIG. 4B, line 144 is connected to circuitry in the timing module which operates the dual channel modules to apply the received control signals to receiving channels connected to the multiplexer. At the same time, the output signal of exclusive-OR circuit 122 (FIG. 7) is used to reset flip-flop 106 to its previous state to maintain signal generator 32 in synchronism with signal generator 26. Similarly, exclusive-OR circuit 126 produces an output signal which is applied to gate 128 when a difference between the received frame identification signal in register stage 104 and the Z-output signal of generator 32 is detected. The output signal of gate 126 is used to reset flip-flop 110 to its previous state to maintain synchronism between signal generator 32 and signal generator 26.

DUAL CHANNEL MODULES

Referring to FIG. 4A, the transmitting section of each dual channel module 44 is designed to sample data and control information from two communication channels, e.g., $A_1$ and $A_2$. As shown, communication channel $A_1$ has separate input lines 150 and 152 for data and control information, respectively. The receiving section of dual channel module 44 illustrated in FIG. 4B is designed to apply data and control information to two receiving channels $A_1$ and $A_2$ which correspond to the communication channels.

As shown in FIG. 4A, each dual channel module 44 is provided with two identical sets of transmitting components for handling information from communication channels $A_1$ and $A_2$. In the detailed description which follows, identical components have been given identical reference numerals to simplify the description of the dual channel module.

In the transmitting section of the dual channel module, a storage device 154 is provided which receives data input signals from input line 150 of communication channel $A_1$. The output of the sampling and storage device 154 is connected to a first input terminal of a gate 156. A line 158 extending from timing module 46 is connected to a second input terminal of gate 156 and is used to apply data load pulses to the gate. The output of gate 156 is connected to the input of register stage 62 of the dual channel module.

The control signals which are applied to input line 152 (FIG. 4A) may be used as on-off signals for a device which is connected to a receiving channel of the multiplexer. Control signals from input line 152 of communication channel $A_1$ are applied to a first input terminal of a gate 160 on dual channel module 44. A second input terminal of gate 160 is connected to line 68 from timing module 46 on which control load pulses are applied to the gate to apply the control signals to register stage 62. The transmitting section of the dual channel module also includes a unit counter 164 for regulating the length of time during which the sampling and storage device 154 is allowed to sample data from input line 150 of the communication channel.

The transmitting section of dual channel module 44 is shown in detail in FIG. 8. The sampling and storage device consists of a sample flip-flop 166 and a storage flip-flop 168. Data signals from input line 150 of the communication channel are applied directly to a first input terminal of the sample flip-flop 166 and, through an inverter 170, to a second input terminal of the flip-flop. The output terminals of sample flip-flop 166 are connected directly to input terminals of storage flip-flop 168. The output of the storage flip-flop 168 is connected to gate 156 which is operated by data load pulses on line 158 from the timing module to transfer data from storage flip-flop 168 to register stage 62. As mentioned above, control signals from the communication channel are applied on input line 152 to gate 160 which is operated by control load pulses from the timing module on line 68 to apply control signals directly to register stage 62. Shift pulses which are derived from the transmit timing pulses applied to clock module 40 (FIG. 4A) are applied on line 172 to the dual channel modules to shift information from register stage 62 of channel $A_1$ to transfer stage 62 of channel $A_2$.

In the normal transmission of data information, control input line 152 of FIG. 8 is turned on and then a series of data signals is applied to data input line 150. During the transmission of data information the control input line remains turned on. As shown in FIG. 8, a secondary control input line 173 may be provided for the transmission of control information in addition to the on-off control signals applied to control input line 152. In the transmission of secondary control information, a secondary control signal is applied to line 173 when control input line 152 is turned off. The appearance of a secondary control signal on line 173 has the same effect on the transmitting section of the dual channel module as the application of a data signal to data input line 150. The secondary control signal is sampled by flip-flop 166, stored in flip-flop 168 and then transferred to register stage 62 through gate 156 which is operated by a data load pulse on line 158. Thus, a secondary control signal can be inserted into a transmission time frame which normally contains data information. The secondary control signal may be used, for example, as a busy signal to indicate that a receiving channel of the multiplexer is temporarily unavailable for communication.

With further reference to FIG. 8, the timing of sample flip-flop 166 is controlled by data entry pulses which appear on a line 174 from a timing module 46. The data entry pulses are applied to a frequency divider 176 which provides output pulses at a first repetition rate $R_1$ which are applied to an operating terminal of sample flip-flop 166 to enable the flip-flop to sample data information from the data input line of the communication channel. The output pulses of frequency divider 176 constitute data sample pulses for sample flip-flop 166 which occur at a repetition rate $R_1$. Frequency divider 176 is designed to divide the frequency of the data entry pulses by 64 and to provide its first output pulse after it has counted 34 input pulses. Thus, in the operation of frequency divider 176, a first output or data sample pulse is generated after 34 input pulses have been counted and, thereafter, an output or data sample pulse is generated for every 64 input pulses. Divider 176 is normally inhibited by a reset signal applied from the output of a start-stop gate 178. The start-stop gate has a first input terminal connected to data input line 150 through inverter 170 and a second input terminal connected to the output of unit counter 164. The output of the start-stop gate is also applied to a reset terminal of the unit counter.

In the operation of the transmitting section of the dual channel module (FIG. 8) control input line 152 is turned on and a start signal is applied to data input line 150 of communication channel $A_1$ when data information is to be transmitted. The start signal inhibits start-stop gate 178 to remove the reset signals applied to unit counter 164 and frequency divider 176. At this time, frequency divider 176 begins to count data entry pulses and when the frequency divider registers a count of 34 pulses it provides an output or data sample pulse which enable flip-flop 166 to sample a data signal from the data input line. Upon the occurrence of the data sample pulse from frequency divider 176, flip-flop 166 is set in accordance with the sampled data signal. Flip-flop 166 continues to sample data input signals as long as frequency divider 176 continues to produce data sample pulses.

Data information is normally applied to data input line 150 in the form of a unit or character of information which consists of a series of data signals. The time during which sample flip-flop 166 is allowed to sample data signals from the data input line, is determined by unit counter 164. As shown in FIG. 8, the output of frequency divider 176 is applied to the input of unit counter 164. An output or data sample pulse from the frequency divider advances unit counter 164 by one count. The unit counter is controlled by program signals from the timing module on a line 180 to allow sample flip-flop 166 to operate for a sufficient length of time to read all the data signals which are contained in a unit (character) of information. When unit counter 164 registers a count indicating that a complete data character has been read, the unit counter produces an output pulse which activates start-stop gate 178. The start-stop gate then applies reset signals to unit counter 164, sample flip-flop 166, and frequency divider 176. Thereafter, the output of start-stop gate 178 prevents the unit counter, the sample flip-flop and the frequency divider from operating until another start signal appears on data input line 150.

As shown in FIG. 8, data signals which are sampled by flip-flop 166 are moved to storage flip-flop 168 by operating pulses which are applied to an operating terminal of storage flip-flop 168 on an input line 182. The origin of the operating pulses on line 182 is discussed below in the description of the timing module. The operating pulses enable storage flip-flop 168 to be set in response to signals appearing at the output terminals of sample flip-flop 166. The repetition rate of the operating pulses on line 182 is the same as the repetition rate $R_1$ of the data sample pulses from frequency divider 176. Since frequency divider 176 produces its first data sample pulse after 34 input pulses, the occurrence of data entry rate pulses does not coincide with the occurrence of operating pulses on line 182.

Data signals are transferred from storage flip-flop 168 to register stage 62 through gate 156 as shown in FIG. 8, at a second repetition rate $R_2$ which is determined by the frequency of occurrence of data load pulses on line 158. The second repetition rate $R_2$ exceeds the first repetition rate so that sampled data signals are transferred from storage flip-flop 168 at a faster rate than they are applied to the storage flip-flop. Repetition rate $R_2$ defines a series of time intervals during which data information may be transmitted by the multiplexer. Since repetition rate $R_2$ exceeds repetition rate $R_1$, an open time interval periodically occurs in the series of time intervals which is not required for the transmission of data information because no new data is available in storage flip-flop 168 to be transferred to register stage 62. When the open time interval appears, a control load pulse is applied to gate 160 on line 68 to permit a control signal from input line 152 of the communication channel to be applied directly to register stage 62 in place of the normally applied data signals. When a control load pulse appears on line 68, no data load pulse is applied to line 158 to operate gate 156 at this time.

In considering the overall operation of the transmitting section of the dual channel modules, the function of that section is to sample data signals from the communication channel at a first repetition rate $R_1$ and to transfer the sampled data signals to a register stage at a second repetition rate $R_2$ which exceeds the first repetition rate $R_1$. The sampling and transfer operations of the transmitting section continue until an open time interval occurs in the second repetition rate $R_2$ in which no new data is available to be transferred to the register stage. At that time, the data transfer operation is temporarily interrupted and a control signal is inserted into the register stage.

As shown in FIG. 4A, the dual channel module contains an identical set of components in its transmitting sections for receiving data and control information from communication channel $A_2$ which performs in the same manner as the transmitting components described above.

Referring to FIG. 4B, the receiving section of the multiplexer includes a shift register which consists of a plurality of register stages including X-register stage 100, a series of register stages 184—184 located in the dual channel modules, Y-register stage 102 and Z-register stage 104. The shift register is operated by shift pulses which are derived from source 54 of clock pulses and are applied to a line 185. The transmission time frames received by the multiplexer are serially applied to the stages of the shift register. When a complete transmission time frame is received, the X-, Y-, and Z-register stages 100, 102, and 104, respectively, contain frame identification signals and the register stages 184—184 contain data signals or control signals. The receiving section of each dual channel module is designed to apply the received data or control signals to a plurality of receiving channels having data output lines and control output lines connected to the dual channel modules.

In dual channel module 44 register stage 184 is connected to input terminals of a first gate 186 and a second gate 188. Gate 186 is operated by data load pulses on a line 190 extending from timing module 46. The function of gate 186 is to transfer data signals from register stage 184 to a storage device 192 which temporarily retains the transferred data signals. Gate 188 is operated by control load pulses on a line 194 from timing module 46, when a control signal is located in register stage 184, to transfer the control signal to a time diffusion circuit 196 which is connected to a control output line 198 of receiving channel $A_1$. The output of storage device 192 is connected to a read gate 200 which is operated by data output pulses on a line 208 from timing module 46. The function of gate 200 is to transfer data signals from storage device 192 to a data output line 204 of the receiving channel.

Time diffusion circuit 196 (FIG. 4B) compares successively received control signals and changes the control signal applied to control output line 198 of the receiving channel only if a predetermined number of successively received control signals are identical. The control signals applied to control output line 198 may be used as on-off signals for a device which is connected to the line for receiving data information on communication channel $A_1$. The purpose of time diffusion circuit 196 is to prevent a spurious control signal, which may result from a single erroneous frame identification signal, from being applied to the receiving channel by requiring that two successive, identical control signals be received before the control output signal on line 198 is changed.

The receiving section of dual channel module 44 is shown in detail in FIG. 9. Gate 186, which is connected to the output of register stage 184, consists of a flip-flop operated by the data load pulses on line 190. Gate 186 is also provided with an input terminal which is connected by line 142 to the output of error counter 134 (FIG. 7). When the error counter produces an output signal on line 142, gate 186 (FIG. 9) is rendered inactive until the output signal on line 142 is removed.

The output terminals of gate 186 are connected to storage device 192. The storage device is a flip-flop operated by pulses which occur on a line 206 from the timing module. The output of storage device 192 is connected to read gate 200 which is another flip-flop that is operated by data output pulses on line 208 from the timing module.

The receiving section of dual channel module 44 also includes a storage flip-flop 188 which is operated by control load pulses on line 194. Time diffusion circuit 196 includes a pair of diffusion gates 210 and 212, illustrated in FIG. 9, having input terminals which are connected to both the input and output terminals of storage flip-flop 188. Diffusion gates 210 and 212 compare successively applied control signals to storage flip-flop 188 and provide a change in output signal only in the event that the successively applied control signals are identical. The output terminals of diffusion gates 210 and 212 are applied to a read gate (flip-flop) 214, which is also operated by control load pulses on line 194, to provide an output to control line 198 of the receiving channel. Read gate 214 is provided with a second output which is connected by a line 215 to a reset terminal of read gate (flip-flop) 200. This second output is used to maintain read gate 200 in its reset state when no control signal is received to prevent data signals from being erroneously applied to data output line 204. When a control signal is received, read gate 214 is turned on and the reset signal applied to line 215 is removed to enable read gate 200 to respond to data signals from storage device 192. Line 142 is also connected to read gate 214, and when an input signal appears on line 142 the read gate is prevented from applying control signals to line 198 until the input signal is removed.

As shown in FIG. 9, the receiving section of the dual channel module may be provided with circuitry for receiving secondary control signals. The secondary control circuitry includes a gate 216 which receives input signals from storage flip-flop 188 and storage device 192. The output of gate 216 is applied directly to a first input of a storage flip-flop 218 and, through an inverter 220, to a second input of storage flip-flop 218. Diffusion gates 222 and 224 which are connected to both the input and output terminals of storage flip-flop 218 are provided. Diffusion gates 222 and 224 compare successively applied signals to storage flip-flop 218 and provide output signals only in the event that the successively applied signals are identical. The output terminals of the gates 222 and 224 are applied to a read gate 226 which is a flip-flop also operated by the control load pulses from line 194. The output of read gate 226 provides a secondary control output for a line 228 in the receiving channel.

Since secondary control signals are transmitted as data signals and only when the control signal applied to line 198 is an off signal, the function of gate 216 is to determine whether this condition is satisfied and to operate a secondary control output line 228 only in the case where the output of storage flip-flop 188 indicates that the control signal is off and the output of storage device 192 indicates that a data signal is present. The secondary control receiving circuitry is similar to the primary control receiving circuitry in that two consecutive, identical secondary control signals must be received before an output signal is applied to line 228 of the receiving channel.

TIMING MODULE

Timing module 46, illustrated generally in FIGS. 4A and 4B, provides timing pulses for the operation of synchronization module 42 and dual channel modules 44—44. The timing module determines the rates at which data and control signals are sampled from the communication channels and applied to the receiving channels. It also determines the rates at which information is transferred into the stages of the shift register of the transmitting section of the multiplexer and removed from the register stages of the shift register of the receiving section. Finally, the timing module 46 determines when control information is to be inserted into a transmission time frame instead of data information.

Referring to FIG. 4A, timing module 46 has an oscillator 230 which provides a fixed frequency output signal to establish a frequency base for the timing operations of the module. The output of oscillator 230 is applied to a frequency divider 232 which provides data entry pulses on line 174 for operating sampling and storage devices 154—154 of the dual channel modules. As shown in FIG. 8, the data entry pulses on line 174 which originate from frequency divider 232 are applied to frequency divider 176 to produce data sample pulses at the first repetition rate $R_1$ for operating sample flip-flop 166.

Referring again to FIG. 4A, the output of the frequency divider 232 is also applied to a detector circuit 234. Parallel clock pulses from frequency divider 50 are applied on a line 236 to detector circuit 234. The function of the detector circuit is to provide output pulses for operating gates 156—156 and 160—160 of the dual channel modules. Detector circuit 234 has a first output connected to line 158 for applying data load pulses to gates 156—156 and a second output connected to line 68 for applying control load pulses to gates 160—160.

In operation the detector circuit produces a series of data load pulses on line 158 at a repetition rate equal to the frequency of the parallel clock pulses. After the series of data load pulses, the detector circuit produces a single control load pulse on line 68.

With further reference to FIG. 4A, timing module 46 includes a program circuit 238 which is connected by line 180 to unit counters 164—164. The program circuit applies a signal to the unit counters for controlling the length of time during which the sampling operations of the dual channel modules are allowed to continue. The length of time is determined by the duration of units or characters of information from the communication channels.

The receiving section of timing module 46 (FIG. 4B) is provided with a frequency divider 240 connected to frequency divider 232 by a line 241. The output of frequency divider 240 is connected to input terminals of read gates 200 of the dual channel modules, and data output pulses from frequency divider 240 determine the repetition rate at which gates 200 are operated.

In addition, timing module 46 has a gate 242 having an output terminal connected by line 190 to gates 186 —186 of the dual channel modules. A first input terminal of gate 242 is connected by a line 244 to the output of frequency divider 52. A second input terminal of gate 242 is connected by line 144 to the output of comparator circuit 32. Gate 242 is pulsed by parallel clock pulses on line 244 from frequency divider 52 and provides an output pulse when comparator circuit 32 produces a positive signal indicating that the received transmission time frame contains data information. The output pulse provided by gate 242 operates gates 186—186 which transfer data signals from register stages 184—184 to storage devices 192—192.

When comparator circuit 32 produces a negative output signal to indicate that the received transmission time frame contains control information, gate 242 is inhibited by the negative signal. The negative signal is applied to an inverter 245 to operate a gate 266 which is also pulsed by parallel clock pulses on line 244 from frequency divider 52. Thus, when control information is received by the multiplexer, gate 266 applies a control load pulse to line 194 to operate gates 188—188 of the dual channel modules to apply control signals from register stages 184—184 to time diffusion circuits 196—196. At this time, a data load pulse does not appear on line 190 since gate 242 is inhibited.

As shown in FIG. 4B, the output of gate 266 is also connected to a phase-control circuit 268. The phase-control circuit regulates the frequency division performed by frequency divider 240 in response to the repetition rate of the control load pulses appearing at the output of gate 266. Phase-control circuit 268 adjusts the frequency of the data output pulses of frequency divider 240 so that the receiving section of the multiplexer applies received data signals to data output lines 204 of the receiving channels at the same rate that the data signals were applied at the communication channels.

The circuitry of timing module 46 is shown in detail in FIG. 10. Detecting circuit 234 of the timing module includes an input flip-flop 270 and a detector flip-flop 272. Parallel clock pulses on line 236 from frequency divider 50 (as seen in FIG. 4A) are applied to the reset terminal of input flip-flop 270. A first output terminal of flip-flop 270 is connected to an operating terminal of detector flip-flop 272. A second output terminal of input flip-flop 270 is connected to one of its input terminals. The output terminals of detector flip-flop 272 are connected to pulse-forming circuits 274 and 276 which are connected to lines 68 and 158, respectively.

Frequency divider 232 (FIG. 4A) of the timing module consists of three separate frequency dividers 278, 280, and 282 which are connected in series as shown in FIG. 10. Frequency divider 278 is connected to the output of oscillator 230. The output of frequency divider 278 is connected to an operating terminal of input flip-flop 270. The output of frequency divider 280 is connected to line 174 and provides data entry pulses for the transmitting sections of the dual channel modules. These data entry pulses are applied to frequency divider 176 (FIG. 8) in the transmitting section of dual channel module 44. Returning to FIG. 10, frequency divider 282 is connected to the output of frequency divider 280, and its output provides operating pulses which are applied to line 182 and are used to operate storage flip-flop 168 (FIG. 8) in the transmitting section of dual channel module 44. The output of frequency divider 282 (FIG. 10) is also connected to a reset terminal of detector flip-flop 272 and to an inhibit terminal on pulse-forming circuit 274.

In the operation of the detecting circuit of timing module 46, parallel clock pulses from frequency divider 50 (FIG. 4A) are applied continuously at repetition rate $R_2$ to the reset terminal of flip-flop 270 on line 236. In addition, as illustrated in FIG. 10, pulses from frequency divider 278, which are derived from oscillator 230, are applied to the operating terminal of flip-flop 270. The flip-flop provides clock pulses which occur at the same repetition rate ($R_2$) as the parallel clock pulses, and which are referred to a time base established by the output pulses of oscillator 230. The clock pulses of the flip-flop 270 are applied to the operating terminal of detector flip-flop 272. The repetition rate of the pulses applied to the reset terminal of detector flip-flop 272 from frequency divider 282 is the same as the repetition rate $R_1$ of data sample pulses derived from frequency divider 176 (FIG. 8).

Initially, detector flip-flop 272 (FIG. 10) is set so that a positive signal is applied to pulse-forming circuit 274 and a negative signal is applied to pulse-forming circuit 276. When an input pulse is applied to detector flip-flop 272 from flip-flop 270, the signals at the output terminals of flip-flop 272 are reversed and a positive pulse is applied to pulse-forming circuit 276, which produces a data load pulse on line 158. Thereafter, when a pulse is applied to detector flip-flop 272 from frequency divider 282, flip-flop 272 is reset to its initial state. Although a positive pulse is applied to pulse-forming circuit 274, the pulse-forming circuit does not produce a control load pulse at this time because it is inhibited by the reset pulse from frequency divider 282 which is applied to detector flip-flop 272. Thus, when clock pulses from flip-flop 270 and reset pulses from frequency divider 282 are alternately applied to detector flip-flop 272, the output pulses produced by the detecting circuit consist of a series of evenly spaced data load pulses on line 158 which occur at repetition rate $R_2$.

Since the repetition rate $R_2$ of the clock pulses applied to detector flip-flop 272 from flip-flop 270 exceeds the repetition rate $R_1$ of the reset pulses from frequency divider 282, there occurs a time when two consecutive clock pulses are applied to the detector flip-flop before the occurrence of a reset pulse. In this instance, the first clock pulse applied to detector flip-flop 172 changes the state of flip-flop 172 so that a positive signal appears at the output terminal of the flip-flop connected to pulse-forming circuit 276 and produces a data load pulse on line 158. When the second clock pulse is applied to detector flip-flop 172, the state of the detector flip-flop is reversed so that a positive signal appears at its output terminal connected to pulse-forming circuit 274. At this time, pulse-forming circuit 274 produces a control load pulse on line 68 since no reset pulse appears at the output of frequency divider 282 to inhibit the pulse-forming circuit from responding to the positive signal applied to its input terminal. When the next reset pulse is applied to detector flip-flop 272 from frequency divider 282, the state of the detector flip-flop is not affected since the detector flip-flop has already been set to its initial state by the previous clock pulse from flip-flop 270.

As shown in FIG. 10, output pulses from frequency divider 278 are applied to frequency divider 240 which produces data output pulses on line 208 for operating read gates 200—200 (FIG. 4B) in the receiving sections of the dual channel modules. The output of frequency divider 240 is also connected to phase-control circuit 268, illustrated in FIG. 10, which regulates the operation of frequency divider 240. Phase-control circuit 268 is operated by control load pulses from gate 266 to adjust the ratio of the pulse repetition rates at the input and output terminals of frequency divider 240.

With reference to FIG. 10, parallel clock pulses are applied to first input terminals of gates 242 and 266 on line 244. As explained above, the output of comparator circuit 32 (FIG. 4B) is applied by line 144 to inverter 245. Inverter 245 (FIG. 10) is connected to an input terminal of a gate 284. When a negative potential is applied to line 144 by comparator circuit 32, a positive input signal is applied to gate 284 from inverter 245. As shown in FIG. 10, a second input terminal of gate 284 is connected to the output of a counter 286. Counter 286 responds to parallel clock pulses on line 244 and produces a positive output signal when it registers a predetermined count. When positive signals from inverter 245 and counter 286 are applied to gate 284, the gate provides an output signal which enables gate 266 to produce a control load pulse when a parallel clock pulse appears on line 244. The output terminal of gate 266 is connected to a reset terminal on counter 286 so that the counter is reset when a control load pulse is produced by gate 266.

The purpose of counter 286 is to establish a predetermined minimum time period between the times at which the receiving section of the multiplexer is able to respond to control signals. Counter 286 prevents gate 266 from producing a control load pulse until the counter has reached its predetermined count. Since the control load pulse from gate 266 is used to operate gates 188—188 (FIG. 4B) in the dual channel modules for applying control signals to output lines 198—198 of the receiving channels, successive operations of gates 188—188 cannot occur in a time period less than the predetermined minimum time period established by counter 286. This limitation on successive operations of gates 188—188 avoids the erroneous application of data signals to control output lines 198 of the receiving channels.

As further shown in FIG. 10, the timing module is also provided with a pulse-forming circuit 288 having input terminals which are connected to the output terminals of frequency divider 240 and gate 242. Pulse-forming circuit 288 provides data storage pulses on line 206 (FIG. 4B) which operate storage devices 192—192 in the receiving sections of the dual channel modules. Pulse-forming circuit 288 is designed to produce a single data storage pulse when it receives a data entry pulse from divider 240 and a data load pulse from gate 242.

OPERATION

In the method of multiplex transmission of the present invention, data and control information from a plurality of communication channels is transmitted in the form of a succession of transmission time frames, each transmission time frame containing information from each of the communication channels. In the multiplex transmission method, the succession of transmission time frames comprises a series of transmission time frames containing data information in which there periodically appears a transmission time frame containing control information. Frame identification signals are transmitted with the data and control information in the transmission time frames to distinguish transmission time frames containing data information from transmission time frames containing control information.

In accordance with the invention, data signals from a plurality of communication channels are sampled at a first repetition rate. As shown in FIG. 4A, a plurality of communication channels are connected to dual channel modules 44—44. Data information from the communication channels is applied to sampling and storage devices 154 in the dual channel modules. The sampling and storage devices are operated by data sample pulses which are derived from frequency divider 232 (FIG. 4A) and occur at a first repetition rate $R_1$.

In accordance with the invention, sampled data signals are transferred into a serial arrangement at a second repetition rate which exceeds the first repetition rate. As shown in FIG. 4A, data signals which have been sampled by sampling and storage devices 154—154 are transferred through gates 156—156 of the dual channel modules to register stages 62—62 of a shift register in the transmitting section of the multiplexer. Gates 156—156 are operated by data load pulses applied to line 158 by detecting circuit 234. The data load pulses occur at a second repetition rate $R_2$ which exceeds the first repetition rate $R_1$.

Since the data signals are transferred from the sampling and storage devices at a faster rate than data signals are sampled from the communication channels, an open time interval periodically occurs in the second repetition rate $R_2$ in which it is not necessary to transfer data from the sampling and storage devices because no new data signals have been sampled from the communication channels.

The occurrence of the open time interval in the second repetition rate may be more clearly understood by considering the graph of FIG. 11. In this graph, it is assumed for purposes of illustration that the first repetition rate $R_1$ of the data sample pulses, i.e., the rate at which data signals are sampled from the communication channels, is 4 pulses per second. It is also assumed for purposes of illustration that the second repetition rate $R_2$ of the data load pulses, i.e., the rate at which the sampled data signals are transferred to register stages 62—62, is 5 pulses per second. It is further assumed that the data sample pulses and the data load pulses do not occur simultaneously at any time.

As shown in FIG. 11, data signals are sampled from the communication channels by the sampling and storage devices which are operated by data sample pulses $S_1$, $S_2$, $S_3$ . . . . , at the rate of 4 pulses per second. Thus, a sampled data signal is allowed to remain in a sampling and storage device 154 (FIG. 4A) for one-fourth of a second. As further shown in FIG. 11, data load pulses $D_1$, $D_2$, $D_3$ . . . . , which transfer data signals from the sampling and storage devices to the stages of the shift register, are applied to gates 156—156 at the rate of 5 pulses per second, and the spacing between consecutive data load pulses is one-fifth of a second. Since there is no time at which a data load pulse and a data sample pulse occur simultaneously, there appears a time interval in the first repetition rate $R_1$, i.e., between successive data sample pulses, in which two data load pulses occur. As shown in FIG. 11, two data load pulses $D_4$ and $D_5$ appear in the time interval between data sample pulses $S_4$ and $S_5$.

Since the data signals in storage during the time interval between pulses $S_4$ and $S_5$ are transferred to the register stages by the first data load pulse $D_4$ in that time interval, the second data load pulse $D_5$ is not required for the transfer of data signals in that time interval because the stored data signals have not been changed. Thus, the second data load pulse $D_5$ may be eliminated and a control load pulse may be provided without diminishing the overall rate at which data signals are sampled and transmitted. The control load pulse provided in place of data load pulse $D_5$ operates gates 160—160 (FIG. 4A) to apply control signals from the communication channels to register stages 62—62. The desired sequence of data load pulses and control load pulses is provided by detecting circuit 234.

Repetition rate $R_2$ thus provides a series of time intervals for the transmission of data information. The series of time intervals is defined by data load pulses $D_1$, $D_2$, $D_3$ . . . . Since repetition rate $R_2$ exceeds repetition rate $R_1$, there is periodically provided an open time interval in the series which is not required for the transmission of data information and which is available for the transmission of control information. In the situation defined with reference to FIG. 11, the open time interval in the second repetition rate $R_2$ occurs in the time interval defined by pulses $D_5$ and $D_6$. Detecting circuit 234 detects the start of the open time interval, i.e., the occurrence of pulse $D_5$, and provides a control load pulse on line 68 (FIG. 4A) at that time. The time interval in the second repetition rate $R_2$ following pulse $D_5$ (FIG. 11) is available for the transmission of control signals since no new data signals have been applied to sampling and storage devices 154—154 of the dual channel module.

In accordance with the invention, serially arranged data information is transmitted as transmission times frames which occur in the series of time intervals in the second repetition rate until the occurrence of the open time interval. Referring to FIG. 4A, the data signals transferred to register stages 62—62 are shifted through the register stages by shift pulses which appear on line 172 from clock module 40. When the open time frame in the second repetition rate occurs, detecting circuit 234 produces a control load pulse on line 68 which operates gates 160—160 to apply control information from the communication channels to register stages 62—62. The control information is transmitted in a transmission time frame during the open time interval defined by the second repetition rate by shift pulses which are applied to the register stages 62—62.

In the method of multiplex transmission of the present invention, the amount of time available for the transmission of data information from the communication channels is conserved by transferring data signals from storage devices 154—154 (FIG. 4A) at a faster rate than the data signals are applied to the storage devices. The data signals are transmitted in time intervals defined by the second repetition rate $R_2$ and, when a time interval occurs in the second repetition rate which is not required for the transmission of data signals, control signals from the communication channels are transmitted. In this method of multiplex transmission, data and control signals from a plurality of communication channels may be transmitted in a series of transmission time frames without interrupting the repetition rate at which data signals are sampled from the communication channels. Since the multiplexer is capable of continuous sampling and transmission of data signals, the time required for the transmission of data signals is not increased by the periodic transmission of control signals in time intervals which are not used or required for the transmission of data signals.

Information signals from the communication channels are transmitted in the form of transmission time frames which contain both information signals and frame identification signals. Referring to FIG. 4A, the information signals are inserted into the transmission time frames by register stages 62—62 of the dual channel modules. Frame identification signals are inserted into the transmission time frames by register stages 60, 64, and 66 of synchronization module 42. The frame identification signals and information signals of the transmission time frames are transmitted by applying shift pulses to the register stages on line 172.

In accordance with the invention, the frame identification signals are varied in accordance with a predetermined signal pattern to identify transmission time frames which contain data signals. With reference to FIG. 4A, the frame identification signals are derived from signal generator 26 of the synchronization module. The signal generator is operated by pulses from frequency divider 50 of the clock module and produces predetermined combinations of signals at its output terminals, which are applied to register stages 60, 64, and 66. In normal operation of the signal generator, the signals appearing at it output terminals vary in accordance with the predetermined pattern and identify transmission time frames which contain data information.

The combination of frame identification signals is altered from the predetermined signal pattern to identify a transmission time frame which contains control signals. As shown in FIG. 4A, signal generator 26 is provided with an input terminal which is connected to line 68. When a control load pulse from detecting circuit 234 is applied to the input terminal of generator 26 on line 68, the combination of frame identification signals produced by the generator is changed to indicate that the transmission time frame contains control signals.

In the receiving section of the multiplexer, the frame identification signals of a received transmission time frame are applied to register stages 100, 102, and 104 as illustrated in FIG. 4B. The information signals of the transmission time frame are applied to register stages 184—184 in the dual channel modules. Comparator circuit 32 of synchronization module 42 compares the received frame identification signal in register stages 102 with the Y-output signal of generator 30 to determine whether the received transmission time frame contains data or control signals.

Comparator circuit 32 provides a positive output signal on line 144 when the received transmission time frame contains data information. The positive output signal operates gate 242 in the timing module. Gate 242 provides a data load pulse which is applied to line 190 to operate gates 186—186 in the dual channel modules. Gates 186—186 transfer data signals from register stages 184—184 to storage devices 192—192. When a data storage pulse is applied to the storage devices on line 206 (illustrated in FIG. 4B) by pulse-forming circuit 288 in the timing module, the storage devices record the data signals in register stages 184—184. When a data output pulse is applied to line 208 from frequency divider 240 in the timing module, read gates 200—200 are operated to apply the data signals stored in storage devices 192—192 to data output lines 204—204 of the receiving channels.

If it is determined that the received transmission time frame contains control signals, comparator circuit 32 produces a negative output signal which inhibits gate 242 and operates gate 266 in the timing module. Gate 266 produces a control load pulse which is applied on line 194 to gates 188—188 in the dual channel modules. When gates 188—188 are operated, control signals from register stages 184—184 are applied to time diffusion circuits 196—196. The time diffusion circuits compare the applied control signals from the register stages with the previously applied control signals and produce changes in the control signals applied to control output lines 198—198 only if the received control signals are identical to the previously received control signals.

With reference to FIG. 4B, if comparator circuit 32 determines that the received transmission time frames are not in synchronism with the the output signals of generator 30, the comparator circuit applies an output pulse to error counter 134. If the error counter registers five consecutive transmission time frames which are out of synchronism with signal generator 30, the error counter produces an output signal which is applied to frequency divider 52 in clock module 40. The signal applied to frequency divider 52 by error counter 134 allows the frequency divider to produce output pulses at the same repetition rate as the clock pulses which are applied from source 54 to operate signal generator 30 at an increased repetition rate until synchronism is restored.

As shown in FIG. 9, the output signal of error counter 134 is also applied on line 142 to gates 186 and 214 in the receiving sections of the dual channel modules. As long as the output signal of error counter 134 continues to appear on line 142, gates 186 and 214 are prevented from applying data and control signals to the receiving channels. Signal generator 30 is operated by input pulses which occur at the same rate as clock pulses from source 54 until comparator circuit 32 indicates that synchronism has been restored. When the received frame identification signals and the output signals of generator 30 are in synchronism, error counting circuit 134 is reset to its initial state and the output signal of the error counter to frequency divider 52 is removed. The receiving section of the multiplexer is then allowed to resume its normal receiving operations.

In the above description of the multiplex communication system of the present invention, data sampling operations have been described as occurring at only one repetition rate $R_1$. The multiplexer of the present invention is designed, however, to permit the sampling of data information from the communication channels and the application of received information to the receiving channels at more than one repetition rate. The detailed description which follows sets forth a modified arrangement of the present invention in which data sampling operations are performed at two repetition rates.

An additional timing module and additional dual channel modules may be provided for the multiplexer (FIGS. 4A and 4B) to enable the communication channels to operate at different repetition rates. For example, if it is desired to provide four additional communication channels to the transmitting section of FIG. 4A which operate at a different repetition rate than communication channels $A_1$, $A_2$, $A_3$, and $A_4$, two additional dual channel modules may be located in the transmitting section to the right of timing module 46. In addition, another timing module which operates at the desired different repetition rate may be located in the transmitting section to the right of the additional dual channel modules.

Referring to FIG. 4A, in the modified arrangement of the invention register stages 62—62 of dual channel modules 44—44 are connected to the corresponding register stages in the additional dual channel modules to provide a shift register in the transmitting section which includes both register stages 62—62 and the register stages of the additional dual channel modules. The last register stage in the transmitting section of the additional dual channel modules is connected through timing module 46 to Y-register stage 64 of synchronization module 42. Similarly, referring to FIG. 4B, register stages 184—184 of dual channel modules 44—44 are connected to the corresponding register stages of the additional dual channel modules to provide a shift register in the receiving section of the multiplexer which includes both register stages 184—184 and the register stages of the additional dual channel modules. The last register stage in the receiving section of the additional dual channel modules is connected through timing module 46 to Y-register stage 102 of synchronization module 42.

In the operation of the transmitting section of the multiplexer, timing module 46 continues to control the sampling, storage, and transfer operations of dual channel modules 44—44, while the additional timing module controls the sampling, storage, and transfer operations of the additional dual channel modules. In the operation of the receiving section of the multiplexer, timing module 46 also continues to control the operations of the components in the receiving sections of dual channel modules 44—44, and the additional timing module controls the operations of the components in the receiving sections of the additional dual channel modules.

As previously explained, the Y-output signal of generator 26 is changed from the normal sequence of signals in the predetermined signal pattern of the generator to indicate transmission time frames which contain control information from communication channels $A_1$, $A_2$, $A_3$, and $A_4$. Since the repetition rate $R_1$, at which data signals are sampled from communication channels $A_1$, $A_2$, $A_3$, and $A_4$, is different from the repetition rate at which data signals are sampled from the communication channels connected to the additional dual channel modules, the control information from the communication channels of the additional dual channel modules is not necessarily located in the same transmission time frames as the control information from communication channels $A_1$, $A_2$, $A_3$, and $A_4$. Thus, to identify transmission time frames which contain control information from the additional communication channels a control identification signal in addition to the Y-output signal of generator 26 must be provided. The Z-output signal of generator 26 is available to identify transmission time frames which contain control information from the additional communication channels.

As shown in FIG. 5, the signal generator is provided with flip-flop 89 and gates 91 and 93 for changing the Z-output signal of the generator when a pulse appears on line 95. Line 95 is connected to the additional timing module in the same manner as line 68 (FIG. 4A) is connected to timing module 46. Thus, when the additional timing module produces a control load pulse on line 95 to apply control signals from the additional communications channels to the register stages of the additional dual channel modules, the Z-output signal of generator 26 is changed to indicate that control information from the additional communication channels is contained in the transmission time frame to be transmitted at that time.

When the transmission time frame containing control information from the additional communication channels is received in the receiving section of the multiplexer, the X-, Y-, and Z-frame identification signals are applied to register stages 100, 102, and 104, respectively, as shown in FIG. 4B. The received frame identification signal applied to Z-register stage 104 is compared with the Z-output signal of generator 30 by exclusive-OR circuit 126 (FIG. 7). Since the Z-frame identification signal has been changed to indicate that control information from the additional communication channels is contained in the transmission time frame, the exclusive-OR circuit applies an input signal to gate 128. As explained above, an input signal is also applied to gate 128 from gate 140 if the parity relationship of the X-, Y-, and Z-frame identification signals is satisfied. Thus, gate 128 provides an output signal to line 129 when exclusive-OR circuit 126 detects a difference between the frame identification signal in the Z-register stage and the Z-output signal of generator 30. Line 129 is connected to the additional timing module in the same manner as line 144 (FIG. 4B) is connected to timing module 46. The signal applied to line 129 from gate 128 indicates to the receiving section of the multiplexer whether the received transmission time frame contains data or control information.

Thus, considering the overall operation of the multiplexer of the present invention when it is provided with dual channel modules operating at different repetition rates, the frame identification signal applied to Y-register stage 64 in the transmitting section of the multiplexer is used to indicate to the receiving section of another multiplexer whether data or control information for the receiving channels $A_1$, $A_2$, $A_3$, and $A_4$ connected to dual channel modules 44—44 is transmitted. Similarly, the frame identification signal applied to the Z-register stage 66 in the transmitting section of the multiplexer is used to indicate to the receiving section of the other multiplexer whether data or control information for the additional receiving channels is transmitted. Thus, it can be seen that the multiplex communication system of the present invention is not limited to sampling or receiving operations at a single repetition rate and that additional transmitting and receiving components may be provided to enable the multiplex transmission system to perform communication operations for communication and receiving channels which operate at different repetition rates.

In the above-detailed description of the invention, a communication system in which data information from the communication channels is sampled one bit at a time is disclosed. The system of the present invention is not limited, however, to sampling of a single bit of data information at a time and it may be modified to provide for sampling of two or more bits of information at a time from each communication channel without departing from the scope of the invention. The capacity of the disclosed system for sampling data information can be increased by providing additional sampling and storage devices and shift register stages in each dual channel module. In addition to increasing the amount of data information which may be transmitted at one time, the increased data sampling capacity also permits a greater number of control signals from the communication channels to be transmitted in the transmission time frames which contain control information.

The invention in its broader aspects is not limited to the specific details shown and described in the specification and modifications may be made in such details without departing from the principles of the present invention and without sacrificing its chief advantages.

I claim:

1. A method of multiplex transmission of data and control information from a plurality of communication channels, which comprises:

sampling data information from the communication channels at a first repetition rate;

transferring the sampled data information into serial arrangement at a second repetition rate which exceeds said first repetition rate to provide a series of time intervals in said second repetition rate for the transmission of data information and to periodically provide an open time interval in said series for the transmission of control information;

transmitting the serially arranged data information as transmission time frames occurring in said series of time intervals until the occurrence of said open time interval; and transmitting control information from the communication channels in a transmission time frame during said open time interval to conserve the amount of time available for the transmission of data information.

2. A method of multiplex transmission of data and control signals from a plurality of communication channels, which comprises:

sampling sets of data signals from the communication channels at a first repetition rate;

transferring the sampled sets of data signals into serial arrangement at a second repetition rate which exceeds said first repetition rate, said second repetition rate defining a series of time intervals for the transmission of data signals in which there periodically appears an open time interval which is not required for the transmission of data signals;

transmitting the serially arranged sets of data signals in transmission time frames occurring in said series of time intervals until the appearance of said open time interval in said second repetition rate; and
transmitting a set of control signals from the communication channels in a transmission time frame during said open time interval to conserve the amount of time available for the transmission of data signals.

3. The method of claim 2, which includes:
combining a set of frame identification signals with each serially arranged set of data signals and with the set of control signals to form transmission time frames which include frame identification signals;
varying the sets of frame identification signals in successive transmission time frames in accordance with a predetermined signal pattern to indicate transmission time frames containing data signals; and
altering the set of frame identification signals which occurs in said open time interval from said predetermined signal pattern to indicate that the transmission time frame transmitted during said open time interval contains control signals.

4. A method of multiplex transmission of data and control information from a plurality of communication channels, which comprises:
transmitting information signals and frame identification signals from the communication channels in the form of a series of transmission time frames containing both information signals and frame identification signals;
varying said frame identification signals in accordance with a predetermined signal pattern to identify transmission time frames which contain data signals; and
altering the combination of identification signals from said predetermined signal pattern to identify a transmission time frame containing control signals.

5. The method of claim 4, wherein:
the frame identification signals in each transmission time frame are divided into groups of identification signals located at separate, fixed positions in said transmission time frame.

6. The method of claim 4, wherein:
the frame identification signals in each transmission time frame are divided into first and second groups of identification signals, said first group located at the beginning of said transmission time frame and said second group located at the end of said transmission time frame.

7. A multiplex transmission system for transmitting data and control information from a plurality of communication channels, which comprises:
means for sampling data information from the communication channels at a first repetition rate;
means for transferring sampled data information into serial arrangement at a second repetition rate which exceeds said first repetition rate, said second repetition rate establishing time intervals for the transmission of data and control information;
means for periodically sampling control information from the communication channels and for arranging the control information in serial arrangement; and
means for transmitting the serially arranged data and control information in a succession of transmission time frames which occur during the time intervals established by said second repetition rate and in which a transmission time frame containing control information periodically appears in a series of transmission time frames containing data information.

8. The multiplex transmission system of claim 7, wherein the means for sampling data information includes:
a plurality of storage devices for receiving data information from the communication channels; and
means for operating said storage devices at the first repetition rate to store data information from the communication channels.

9. The multiplex transmission system of claim 8, wherein the means for transferring sampled data information into serial arrangement includes:
a shift register having a plurality of register stages corresponding to the number of said storage devices;
a plurality of gates connecting said storage devices to said register stages; and
means for operating said gates at the second repetition rate which exceeds said first repetition rate to transfer data information from said storage devices to said register stages.

10. The multiplex transmission system of claim 9, wherein the means for periodically sampling control information includes:
a plurality of gates connected to said register stages for receiving control information from the communication channels; and
means for periodically operating said gates during the time intervals defined by said second repetition rate to apply control information from the communication channels to said register stages.

11. The multiplex transmission system of claim 9, wherein the means for transmitting the serially arranged data and control information includes:
means for continuously operating said shift register to shift the information from the communication channels through said register to form a succession of transmission time frames containing data information in which there periodically appears a transmission time frame containing control information.

12. A circuit for performing multiplex transmission of data and control information from a plurality of communication channels, which comprises:
a plurality of storage devices for receiving data information from the communication channels;
means for applying data signals from the communication channels to said storage devices at a first repetition rate;
means for transferring stored data information from said storage devices into serial arrangement at a second repetition rate which exceeds said first repetition rate, said second repetition rate defining a series of time intervals for the transmission of data information in which there periodically appears an open time interval which is not required for the transmission of data information;
means for transmitting the serially arranged data information in a succession of transmission time frames during the time intervals of said second repetition rate; and
means for transmitting control information in a transmission time frame during said open time interval to conserve the amount of time available for the transmission of data information.

13. The circuit of claim 12, which includes:
means for inserting identification signals in the transmission time frames to distinguish transmission time frames containing data information from transmission time frames containing control information.

14. The circuit of claim 13, wherein the means for inserting identification signals includes:
means for generating identification signals which vary in accordance with a predetermined signal pattern to identify transmission time frames which contain data information; and
means for altering the combination of identification signals from said predetermined signal pattern during said open time interval to identify a transmission time frame containing control information.

15. A circuit for performing multiplex transmission of data and control information from a plurality of communication channels, which comprises:
a plurality of storage devices for receiving data information from the communication channels;
a shift register having a plurality of register stages corresponding to said storage devices through which information may be shifted in serial fashion;
means for sampling and applying data information from the communication channels to said storage devices at a first repetition rate;

transfer means for transferring stored data information from said storage devices to said register stages at a second repetition rate which exceeds said first repetition rate, said second repetition rate defining a series of time intervals for the transmission of data information in which there periodically appears an open time interval which is not required for the transmission of data information;

means for applying control information from the communication channels to said register stages during said open time interval in place of the normally transferred data information; and means for shifting the information applied to said shift register through said register stages to form a succession of transmission time frames containing data information in the time intervals of said second repetition rate in which there periodically appears a transmission time frame containing control information.

16. The circuit of claim 15, wherein:

said shift register includes additional register stages for receiving frame identification signals; and which includes means for applying a set of frame identification signals to said additional register stages which are varied in accordance with a predetermined signal pattern to identify transmission time frames which contain data information; and means for altering the set of frame identification signals from said predetermined signal pattern when said open time interval appears to identify a transmission time frame which contains control information.

17. The multiplex transmission system of claim 15, wherein said transfer means comprises:

a set of gates connecting said storage devices to said register stages for transferring data information from said storage devices to said register stages; and means for operating said transfer gates at a second repetition rate exceeding said first repetition rate, said second repetition rate defining a series of time intervals during which data information is transferred from said storage devices to said register stages and in which there periodically appears an open time interval which is not required for the transfer of data information.

18. The multiplex transmission system of claim 15, wherein the means for applying control information from the communication channels to the register stages comprises:

a set of gates connected between the communication channels and said register stages through which control information may be applied to said register stages; and means for operating the set of gates during said open time interval to apply control information to said register stages.

19. The multiplex transmission system of claim 15, wherein the means for sampling and applying data information to the storage devices comprises:

a first set of flip-flops connected to the communication channels for receiving data information from the communication channels;

a second set of flip-flops connected to said first set of flip-flops for storing data information received from the communication channels;

means for operating said first set of flip-flops at a fixed repetition rate to sample data information from the communication channels; and means for operating said second set of flip-flops at the same fixed repetition rate to store the data information sampled by said first set of flip-flops.

20. The multiplex transmission system of claim 15, wherein:

said shift register includes additional register stages for receiving identification signals; and which includes means for generating a set of identification signals which vary in accordance with the predetermined signal pattern and applying the identification signals to said additional register stages to identify transmission time frames containing data information; and means for altering the set of identification signals from said predetermined signal pattern when said open time interval appears to indicate a transmission time frame which contains control information.

21. In a multiplex transmission system for transmitting data and control information from a plurality of communication channels:

a plurality of sampling devices for receiving data information from the communication channels;

a shift register having a plurality of register stages corresponding to said sampling devices for receiving either data or control information;

a first set of gates connected between said sampling devices and said register stages;

a second set of gates for applying control information from the communication channels to said register stages;

means for operating said sampling devices at a first repetition rate to sample data information from the communication channels;

means for operating said first set of gates at a second rate which exceeds said first repetition rate to apply the sampled data information to said register stages;

means for periodically operating said second set of gates to apply control information from the communication channels to said register stages in place of the normally applied data information; and means for continuously operating said shift register to shift the applied data and control information through the register stages to form a succession of transmission time frames containing data information in which there periodically appears a transmission time frame containing control information.

22. A multiplex transmission system for transmitting data and control information from a plurality of communication channels, which comprises:

means for transmitting data information from the communication channels in a succession of transmission time frames which contain data information from each communication channel;

means for periodically transmitting a transmission time frame which contains control information from the communication channels in place of a transmission time frame containing data information;

means for inserting frame identification signals which vary in accordance with a predetermined signal pattern into the transmission time frames to identify transmission time frames which contain data information; and means for altering the frame identification signals from the predetermined signal pattern during the transmission of a transmission time frame containing control information.

23. The multiplex transmission system of claim 22, wherein the means for inserting frame identification signals includes:

a signal generator for producing a set of output signals which vary in accordance with a predetermined signal pattern to identify transmission time frames which contain data information.

24. The multiplex transmission system of claim 23, wherein the signal generator includes:

means for changing at least one of the output signals of said signal generator to alter the set of output signals from said predetermined signal pattern.

25. In a multiplex transmission system for transmitting data and control information from a plurality of communication channels:

a shift register having a first set of register stages for receiving signals from the communication channels and a second set of register stages for receiving identification signals;

means for applying data signals from the communication channels to said first set of register stages at a fixed repetition rate;

means for applying a set of identification signals to said second set of register stages which vary in accordance with a predetermined signal pattern to indicate that said shift register contains data signals;

means for periodically applying control signals from the communication channels to said first set of register stages in place of data signals; and means for periodically altering the set of identification signals applied to said second set of register stages from said predetermined signal pattern to indicate that the shift register contains control signals.

26. A multiplex communication system for transmitting data and control information from a plurality of communication channels to a plurality of receiving channels, which comprises:

means for transmitting data information from the communication channels in a succession of transmission time frames which contain data information from each communication channel;

means for inserting frame identification signals which vary in accordance with a predetermined signal pattern into the transmission time frames to identify transmission time frames which contain data information;

means for periodically transmitting a transmission time frame which contains control information from the communication channels in place of a transmission time frame containing data information;

means for altering the frame identification signals from the predetermined signal pattern inserted during the transmission of a transmission time frame containing data information;

means for receiving the data and control information and frame identification signals of successive transmission time frames;

a comparator responsive to the received frame identification signals of the transmission time frames for determining whether the transmission time frames contain data or control information; and means operated by said comparator for applying the data and control information of the transmission time frames to the receiving channels.

27. The multiplex communication system of claim 26, wherein:

said means for inserting frame identification signals into the transmission time frames includes a first signal generator for producing a set of output signals which vary in accordance with a predetermined signal pattern; and which includes a second signal generator connected to said comparator for producing a set of output signals which vary in accordance with the same predetermined signal pattern as said first signal generator.

28. The multiplex communication system of claim 26, wherein the means for receiving successive transmission time frames includes:

a shift register having a plurality of register stages corresponding in number to the communication channels for receiving data or control information of the transmission time frames.

29. The multiplex communication system of claim 28 wherein:

said shift register includes additional register stages for receiving the frame identification signals of the transmission time frames.

30. The multiplex communication system of claim 29, wherein:

said comparator compares the received frame identification signals in said additional register stages of the shift register with the output signals of said second signal generator and produces a first output signal indicating that data information has been received or a second output signal indicating that control information has been received; and which includes a first set of gates operated by the first output signal of said comparator for applying data information from said shift register to the receiving channels; and a second set of gates operated by the second output signal of said comparator for applying control information in said shift register to the receiving channels.

* * * * *